United States Patent
Bisaiji et al.

(10) Patent No.: US 9,181,889 B2
(45) Date of Patent: Nov. 10, 2015

(54) EXHAUST PURIFICATION SYSTEM OF INTERNAL COMBUSTION ENGINE

(75) Inventors: Yuki Bisaiji, Mishima (JP); Kohei Yoshida, Gotemba (JP); Mikio Inoue, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 611 days.

(21) Appl. No.: 13/505,659

(22) PCT Filed: Aug. 29, 2011

(86) PCT No.: PCT/JP2011/070085
§ 371 (c)(1),
(2), (4) Date: May 2, 2012

(87) PCT Pub. No.: WO2013/031027
PCT Pub. Date: Mar. 7, 2013

(65) Prior Publication Data
US 2013/0052086 A1    Feb. 28, 2013

(51) Int. Cl.
*F01N 3/10* (2006.01)
*F02D 41/14* (2006.01)
(Continued)

(52) U.S. Cl.
CPC ........ *F02D 41/1408* (2013.01); *B01D 53/9409* (2013.01); *B01D 53/9495* (2013.01); *F01N 3/0814* (2013.01); *F01N 3/0842* (2013.01); *F01N 3/0871* (2013.01); *F01N 3/2073* (2013.01); *B01D 2251/208* (2013.01);
(Continued)

(58) Field of Classification Search
CPC ............ B01D 53/9409; B01D 53/9495; F02D 41/1408; F01N 3/0814; F01N 3/0871; F01N 3/2073; F01N 3/0842
USPC .................................... 60/303; 422/108, 111
See application file for complete search history.

(56) References Cited

U.S. PATENT DOCUMENTS 7,332,135 B2 *  2/2008  Gandhi et al. ................. 422/177
2004/0020192 A1 *  2/2004  Kimura et al. .................. 60/286
(Continued)

FOREIGN PATENT DOCUMENTS

JP    A-2005-113801    4/2005
JP    A-2008-2451      1/2008
(Continued)

*Primary Examiner* — Jason Shanske
(74) *Attorney, Agent, or Firm* — Oliff PLC

(57) ABSTRACT

An exhaust purification system of an internal combustion engine is provided with an exhaust purification catalyst where $NO_X$ which is contained in exhaust gas and modified hydrocarbons react. The exhaust purification catalyst carries precious metal catalysts and is formed with a basic exhaust gas flow surface part. The exhaust purification catalyst has the property of reducing $NO_X$ if making the concentration of hydrocarbons which flow into the exhaust purification catalyst vibrate by within a predetermined range of amplitude and within a predetermined range of period. The system estimates the holding ability by which the $NO_X$ in the exhaust gas is held on the basic exhaust gas flow surface part of the exhaust purification catalyst and, when the holding ability becomes less than a predetermined judgment value of the holding ability, makes the concentration of hydrocarbons which flow into the exhaust purification catalyst rise.

12 Claims, 18 Drawing Sheets

(51) Int. Cl.
  *F01N 3/08* (2006.01)
  *F01N 3/20* (2006.01)
  *B01D 53/94* (2006.01)
  *F02D 41/02* (2006.01)
  *F02D 41/40* (2006.01)
  *F01N 3/035* (2006.01)

(52) U.S. Cl.
  CPC . *B01D2255/1021* (2013.01); *B01D 2255/1023* (2013.01); *B01D 2255/1025* (2013.01); *F01N 3/035* (2013.01); *F01N 2510/06* (2013.01); *F01N 2610/03* (2013.01); *F01N 2900/0601* (2013.01); *F01N 2900/08* (2013.01); *F01N 2900/1402* (2013.01); *F01N 2900/1411* (2013.01); *F01N 2900/1614* (2013.01); *F01N 2900/1621* (2013.01); *F02D 41/0275* (2013.01); *F02D 41/1461* (2013.01); *F02D 41/405* (2013.01); *F02D 2200/0806* (2013.01); *F02D 2200/0811* (2013.01)

(56) References Cited

U.S. PATENT DOCUMENTS

| | | | | |
|---|---|---|---|---|
| 2004/0050037 | A1* | 3/2004 | Betta et al. | 60/286 |
| 2009/0000277 | A1* | 1/2009 | Yoshida et al. | 60/286 |
| 2009/0049826 | A1* | 2/2009 | Toshioka et al. | 60/286 |
| 2009/0241522 | A1* | 10/2009 | Dalla Betta et al. | 60/295 |
| 2010/0287917 | A1* | 11/2010 | Wada et al. | 60/299 |

FOREIGN PATENT DOCUMENTS

| | | |
|---|---|---|
| JP | A-2009-168031 | 7/2009 |
| JP | A-2010-48134 | 3/2010 |

\* cited by examiner

EXHAUST PURIFICATION SYSTEM OF INTERNAL COMBUSTION ENGINE

TECHNICAL FIELD

The present invention relates to an exhaust purification system of an internal combustion engine.

BACKGROUND ART

The exhaust gas of diesel engines, gasoline engines, and other internal combustion engines includes, for example, carbon monoxide (CO), unburned fuel (HC), nitrogen oxides ($NO_X$), particulate matter (PM), and other constituents. The internal combustion engines are mounted with exhaust purification systems for removing these constituents. As one method which removes nitrogen oxides, it is known to arrange an $NO_X$ storage catalyst in the engine exhaust passage. Japanese Patent Publication (A) No. 2010-48134 discloses an exhaust purification system which arranges a plurality of $NO_X$ storage catalysts in the exhaust passage and provides fuel feeding means for feeding fuel to the respective $NO_X$ storage catalysts. It is disclosed to feed fuel from the fuel feeding means to the respectively corresponding $NO_X$ storage catalysts when the $NO_X$ storage catalysts should be made to release the stored $NO_X$ for reduction. Further, this publication discloses to set fuel feed amounts from the plurality of fuel feeding means so that the total value of fuel feed amounts from the fuel feeding means substantially matches a target value. Furthermore, it discloses to use the set feed amounts and the temperatures of the $NO_X$ storage catalysts as the basis to calculate the $NO_X$ purification rates of the $NO_X$ storage catalysts and to set the fuel feed amounts from the fuel feeding means so that the total value of the $NO_X$ purification rates exceeds an allowable value.

CITATIONS LIST

Patent Literature

PLT 1: Japanese Patent Publication (A) No. 2010-48134

SUMMARY OF INVENTION

Technical Problem

As explained in the above publication, the $NO_X$ which is contained in exhaust gas can be removed by an $NO_X$ storage catalysts which repeatedly store $NO_X$ and release and reduce $NO_X$. In the prior art, by maintaining the air-fuel ratio of the exhaust gas which flows into the $NO_X$ storage catalysts lean for a long time, it is possible to make the $NO_X$ be absorbed inside of an $NO_X$ absorbent in the form of nitrate ions and thereby possible to remove the $NO_X$ from the exhaust gas. The $NO_X$ which is absorbed inside of the $NO_X$ absorbent is released from the inside of the absorbent by making the air-fuel ratio of the exhaust gas the stoichiometric air-fuel ratio or rich. The $NO_X$ which is released from the inside of the absorbent is reduced to nitrogen by the hydrocarbons or other reducing agents which are contained in the exhaust gas. When performing control to maintain the air-fuel ratio of the exhaust gas lean for a long time, then make the air-fuel ratio of the exhaust gas rich so as to remove the $NO_X$, there was the problem that if the $NO_X$ storage catalysts became a high temperature, the $NO_X$ purification rate would fall.

The present invention has as its object to provide an exhaust purification system of an internal combustion engine which is provided with an exhaust purification catalyst which removes $NO_X$ and can give a high $NO_X$ purification rate even when the exhaust purification catalyst becomes a high temperature.

Solution to Problem

The exhaust purification system of an internal combustion engine of the present invention is a system wherein, inside an engine exhaust passage, an exhaust purification catalyst is arranged for causing a reaction between $NO_X$ which is contained in exhaust gas and modified hydrocarbons, precious metal catalysts are carried on an exhaust gas flow surface of the exhaust purification catalyst, and a basic exhaust gas flow surface part is formed around the precious metal catalysts, and the exhaust purification catalyst has a property of reducing $NO_X$ which is contained in exhaust gas if making a concentration of hydrocarbons which flow into the exhaust purification catalyst vibrate by within a predetermined range of amplitude and within a predetermined range of period and has a property of a storage amount of $NO_X$ which is contained in the exhaust gas increasing if making a vibration period of the concentration of hydrocarbons longer than the predetermined range. The system estimates a holding ability for holding $NO_X$ in the exhaust gas on the basic exhaust gas flow surface part of the exhaust purification catalyst when performing control to make the concentration of hydrocarbons which flow into the exhaust purification catalyst vibrate by within the predetermined range of amplitude and within the predetermined range of period and, when the holding ability becomes less than a predetermined judgment value of the holding ability, makes the concentration of hydrocarbons which flow into the exhaust purification catalyst rise.

In the above invention, the system may estimate a maximum speed by which $NO_X$ in the exhaust gas can be held on the basic exhaust gas flow surface part of the exhaust purification catalyst, that is, a holdable speed, and use the holdable speed as the basis to estimate the holding ability.

In the above invention, the system may estimate the held $NO_X$ amount which is held on the basic exhaust gas flow surface part and use the estimated held $NO_X$ amount as the basis to estimate the holdable speed.

In the above invention, the system may detect an operating state of the internal combustion engine and use the operating state of the internal combustion engine as the basis to correct the holdable speed.

In the above invention, the holding ability may include a purification rate of $NO_X$ of the exhaust purification catalyst, and the system may estimate a $NO_X$ amount which flows into the exhaust purification catalyst per unit time, use the $NO_X$ amount which flows into the exhaust purification catalyst per unit time and a predetermined judgment value of the purification rate of $NO_X$ as the basis to set a requested holding speed, and, when the holdable speed becomes less than the requested holding speed, judge that the holding ability has become less than the predetermined judgment value of the holding ability.

In the above invention, the system may estimate a held $NO_X$ amount which is held on the basic exhaust gas flow surface part and, when a estimated held $NO_X$ amount exceeds the predetermined judgment value of the held $NO_X$ amount, judge that the holding ability has become less than the judgment value of the holding ability.

In the above invention, the system may estimate a held $NO_X$ amount which is held on the basic exhaust gas flow surface part and use a estimated held $NO_X$ amount as the basis to set the amplitude of the concentration of hydrocarbons which flow into the exhaust purification catalyst.

In the above invention, the system may detect the operating state of the internal combustion engine and use the operating state of the internal combustion engine as the basis to correct the amplitude of the concentration of hydrocarbons which flow into the exhaust purification catalyst.

In the above invention, by having the $NO_X$ which is contained in the exhaust gas and the modified hydrocarbons react inside the exhaust purification catalyst, a reducing intermediate which contains nitrogen and hydrocarbons is produced. The vibration period of the concentration of hydrocarbons may be a period required for continued production of the reducing intermediate.

In the above invention, the vibration period of the concentration of hydrocarbons may be from 0.3 second or more to within 5 seconds.

In the above invention, the precious metal catalyst may be comprised of at least one of rhodium Rh and palladium Pd and of platinum Pt.

In the above invention, the exhaust purification catalyst may include a basic layer which is formed on the exhaust gas flow surface and which contains an alkali metal or alkali earth metal or rare earth or metal which can donate electrons to the $NO_X$. A surface of the basic layer may form the basic exhaust gas flow surface part.

Advantageous Effects of Invention

According to the present invention, it is possible to provide an exhaust purification system of an internal combustion engine which can give a high $NO_X$ purification rate even when the exhaust purification catalyst becomes a high temperature.

DESCRIPTION OF EMBODIMENTS

Referring to FIG. 1 to FIG. 30, an exhaust purification system of an internal combustion engine in an embodiment will be explained. In the present embodiment, the explanation will be given with reference to the example of a compression ignition type internal combustion engine which is mounted in an automobile.

Figure 1:
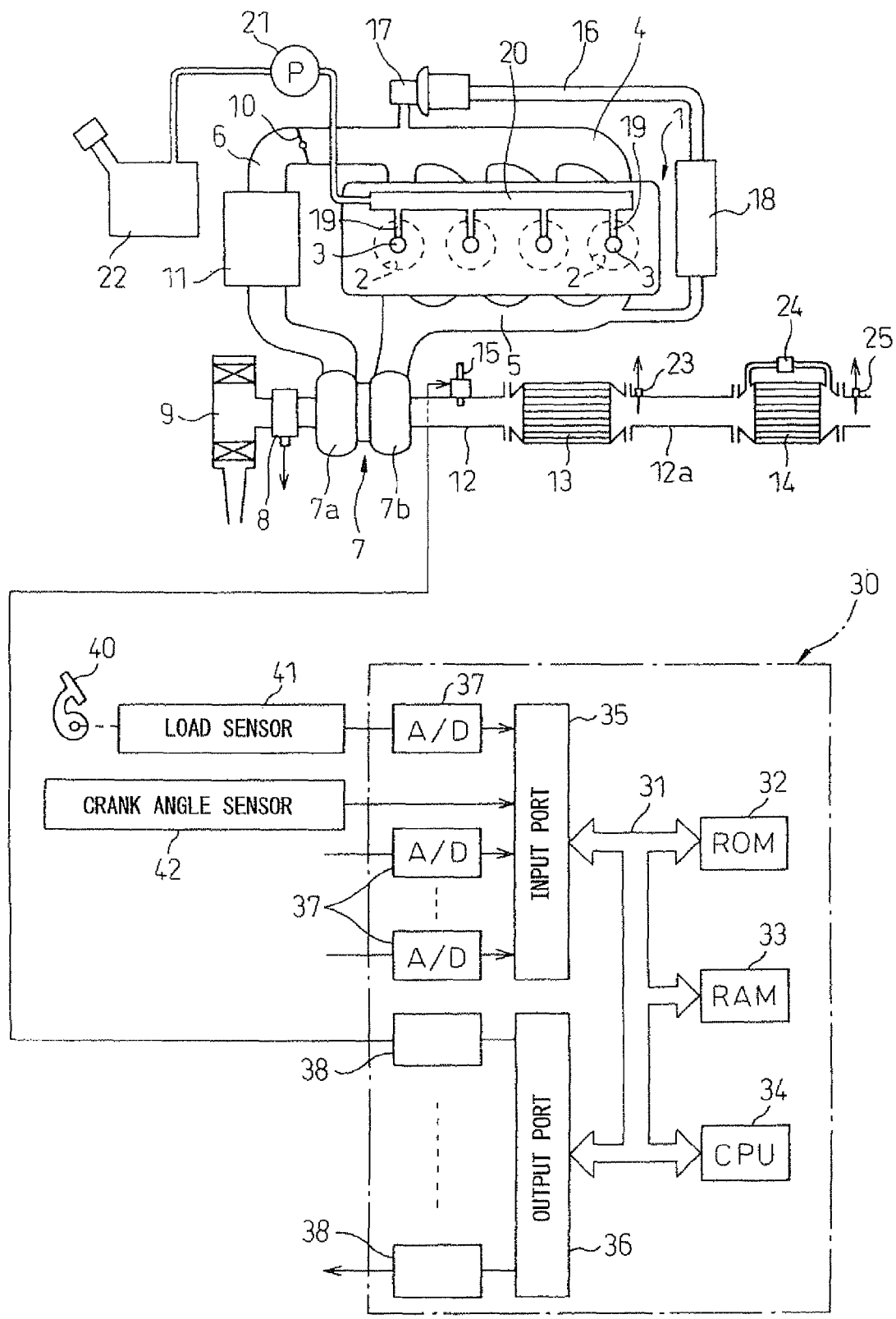
FIG. 1 is an overall view of a compression ignition type of internal combustion engine in an embodiment.

FIG. 1 is an overall view of an internal combustion engine in the present embodiment. The internal combustion engine is provided with an engine body 1. Further, the internal combustion engine is provided with an exhaust purification system which purifies exhaust gas. The engine body 1 includes cylinders comprised of combustion chambers 2, electronic control type fuel injectors 3 for injecting fuel to the respective combustion chambers 2, an intake manifold 4, and an exhaust manifold 5.

The intake manifold 4 is connected through an intake duct 6 to an outlet of a compressor 7a of an exhaust turbocharger 7. The inlet of the compressor 7a is connected through an intake air detector 8 to an air cleaner 9. Inside of the intake duct 6, a throttle valve 10 which is driven by a step motor is arranged. Furthermore, in the middle of the intake duct 6, a cooling device 11 is arranged for cooling the intake air which flows through the inside of the intake duct 6. In the embodiment which is shown in FIG. 1, engine cooling water is guided to the cooling device 11. The engine cooling water is used to cool the intake air.

On the other hand, the exhaust manifold 5 is connected to an inlet of a turbine 7b of an exhaust turbocharger 7. The outlet of the exhaust turbine 7b is connected through an exhaust pipe 12 to an inlet of an exhaust purification catalyst 13. An outlet of the exhaust purification catalyst 13 is connected through an exhaust pipe 12a to a particulate filter 14 which traps particulate matter which is contained in the exhaust gas.

Upstream of the exhaust purification catalyst 13, a hydrocarbon feed valve 15 is arranged for feeding hydrocarbons comprised of the diesel oil or other fuel which is used as fuel of a compression ignition type internal combustion engine. In the present embodiment, diesel oil is used as the hydrocarbons which are fed from the hydrocarbon feed valve 15. Note that, the present invention can also be applied to a spark ignition type of internal combustion engine in which the air-fuel ratio at the time of combustion is controlled to be lean. In this case, from the hydrocarbon feed valve, hydrocarbons comprised of the gasoline or other fuel which is used as fuel of a spark ignition type of internal combustion engine is fed.

Between the exhaust manifold 5 and the intake manifold 4, an EGR passage 16 is arranged for performing exhaust gas recirculation (EGR). Inside the EGR passage 16, an electronic control type EGR control valve 17 is arranged. Further, in the middle of the EGR passage 16, a cooling device 18 is arranged so as to cool the EGR gas which flows through the inside of the EGR passage 16. In the embodiment which is shown in FIG. 1, the engine cooling water is guided to the inside of the cooling device 18. The engine cooling water is used to cool the EGR gas.

Each fuel injector 3 is connected through a fuel feed pipe 19 to a common rail 20. The common rail 20 is connected through an electronic control type variable discharge fuel pump 21 to a fuel tank 22. The fuel which is stored in the fuel tank 22 is fed by the fuel pump 21 to the inside of the common rail 20. The fuel which is fed to the inside of the common rail 20 is fed through each fuel feed pipe 19 to each fuel injector 3.

The electronic control unit 30 is comprised of a digital computer. The electronic control unit 30 in the present embodiment functions as a control device of the exhaust purification system. The electronic control unit 30 includes components which are connected to each other by a bidirectional bus 31 such as a ROM (read only memory) 32, RAM (random access memory) 33, CPU (microprocessor) 34, input port 35, and output port 36. The ROM 32 is a read only storage device. The ROM 32 stores in advance maps and other information required for control. The CPU 34 can perform any processing or judgment. The RAM 33 is a rewritable storage device. The RAM 33 can store operational history and other information or store processing results.

Downstream of the exhaust purification catalyst 13, a temperature sensor 23 is mounted for detecting the temperature of the exhaust purification catalyst 13. Further, downstream of the particulate filter 14, a temperature sensor 25 is mounted for detecting the temperature of the particulate filter 14. The particulate filter 14 has attached to it a differential pressure sensor 24 for detecting the differential pressure before and after the particulate filter 14. The output signals of these temperature sensors 23 and 25, differential pressure sensor 24, and intake air detector 8 are input through the corresponding AD converters 37 to the input port 35.

Further, the accelerator pedal 40 has connected to it a load sensor 41 which generates an output voltage which is proportional to the amount of depression of the accelerator pedal 40. The output voltage of the load sensor 41 is input through a corresponding AD converter 37 to the input port 35. Furthermore, the input port 35 has connected to it a crank angle sensor 42 which generates an output pulse every time the crankshaft rotates by for example 15°. The output of the crank angle sensor 42 can be used to detect the crank angle or the engine speed. On the other hand, the output port 36 is connected through corresponding drive circuits 38 to the fuel injectors 3, step motor for driving the throttle valve 10, hydrocarbon feed valve 15, EGR control valve 17, and fuel pump 21. These fuel injectors 3, throttle valve 10, hydrocarbon feed valve 15, EGR control valve 17, etc. are controlled by the electronic control unit 30.

The particulate filter 14 is a filter which removes carbon particles, sulfates, and other particulate matter. The particulate filter 14, for example, has a honeycomb structure and has a plurality of channels which extend in a direction of flow of the gas. In the plurality of channels, channels with downstream ends which are sealed and channels with upstream ends which are sealed are alternately formed. The partition walls of the channels are formed by a porous material such as cordierite. The particulate matter is trapped when the exhaust gas passes through the partition walls.

The particulate matter is trapped on the particulate filter 14 and oxidized. The particulate matter which gradually deposits on the particulate filter 14 is removed by oxidation by raising the temperature in an air-excess atmosphere until for example 650° C. or so.

Figure 2:
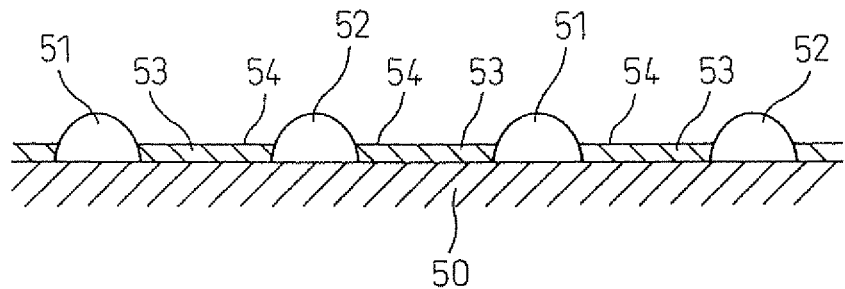
FIG. 2 is a view schematically showing a surface part of a catalyst carrier.

FIG. 2 is an enlarged view of a surface part of a catalyst carrier which is carried on a substrate of the exhaust purification catalyst in the present embodiment. The exhaust purification catalyst 13 is provided with a substrate which includes passages through which the exhaust gas circulates. On the surfaces of the passages of the substrate, a catalyst carrier 50 is arranged for carrying catalyst particles 51 and 52 serving as the precious metal catalyst. In the present embodiment, for example, there is provided a catalyst carrier 50 made of alumina on which precious metal catalyst particles 51 and 52 are carried. Furthermore, on the surface of the catalyst carrier 50, a basic layer 53 is formed which includes at least one element selected from potassium K, sodium Na, cesium Cs, or another such alkali metal, barium Ba, calcium Ca, or another such alkali earth metal, a lanthanoid or another such rare earth and silver Ag, copper Cu, iron Fe, iridium Ir, or another metal able to donate electrons to $NO_X$. The exhaust gas flows along the top of the catalyst carrier 50, so the precious metal catalysts 51 and 52 can be said to be carried on the exhaust gas flow surface of the exhaust purification catalyst 13. Further, the surface of the basic layer 53 exhibits basicity, so the surface of the basic layer 53 is called the "basic exhaust gas flow surface part 54".

On the other hand, in FIG. 2, the precious metal catalyst particles 51 are comprised of platinum Pt, while the precious metal catalyst particles 52 are comprised of rhodium Rh. That is, the precious metal catalyst particles 51 and 52 which are carried on the catalyst carrier 50 are comprised of platinum Pt and rhodium Rh. Note that, on the catalyst carrier 50 of the exhaust purification catalyst 13, in addition to platinum Pt and rhodium Rh, palladium Pd may be further carried or, instead of rhodium Rh, palladium Pd may be carried. That is, the precious metal catalyst particles 51 and 52 which are carried on the catalyst carrier 50 are comprised of platinum Pt and at least one of rhodium Rh and palladium Pd.

Figure 3:
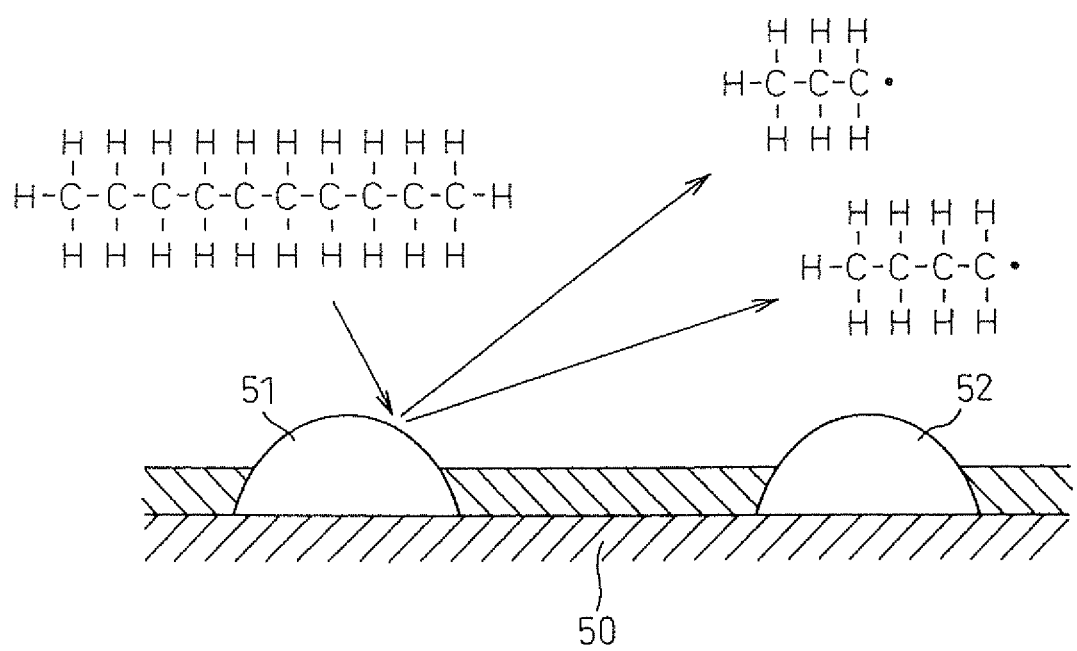
FIG. 3 is a view for explaining an oxidation reaction in an exhaust purification catalyst.

FIG. 3 schematically shows a modification action of hydrocarbons performed in the exhaust purification catalyst of the present embodiment. As shown in FIG. 3, the hydrocarbons HC which are injected from the hydrocarbon feed valve 15 become radical hydrocarbons HC with a small number of carbon atoms due to the catalytic action of the catalyst particles 51.

Figure 4:
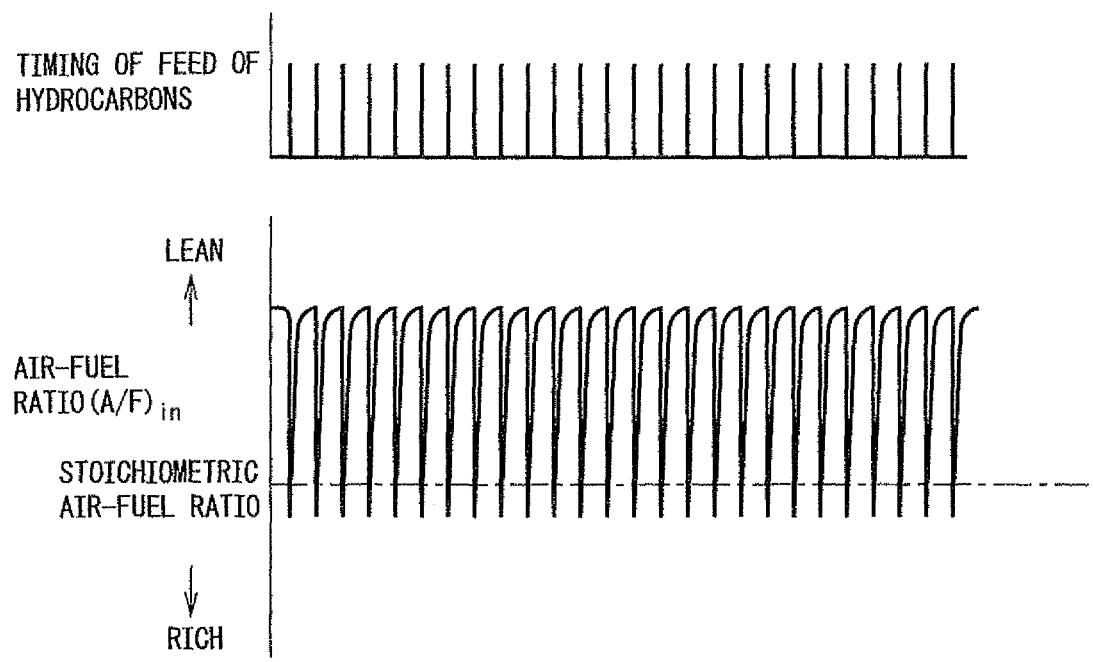
FIG. 4 is a view which shows a change of an air-fuel ratio of exhaust gas which flows into an exhaust purification catalyst in a first $NO_X$ purification method.

FIG. 4 shows a feed timing of hydrocarbons from the hydrocarbon feed valve and a change in the air-fuel ratio of the exhaust gas which flows into the exhaust purification catalyst. In the present invention, the ratio of the air and fuel (hydrocarbons) which are supplied into the engine intake passage, combustion chambers, and exhaust passage upstream of the exhaust purification catalyst is referred to as "the air-fuel ratio (A/F) of the exhaust gas." The changes in the air-fuel ratio $(A/F)_{in}$ of the exhaust gas which flows into the exhaust purification catalyst depend on the change in concentration of the hydrocarbons in the exhaust gas which flows into the exhaust purification catalyst 13, so it can be said that the change in the air-fuel ratio $(A/F)_{in}$ shown in FIG. 4 expresses the change in concentration of the hydrocarbons. However, if the hydrocarbon concentration becomes higher, the air-fuel ratio $(A/F)_{in}$ becomes smaller, so, in FIG. 4, the more to the rich side the air-fuel ratio $(A/F)_{in}$ becomes, the higher the hydrocarbon concentration.

Figure 5:
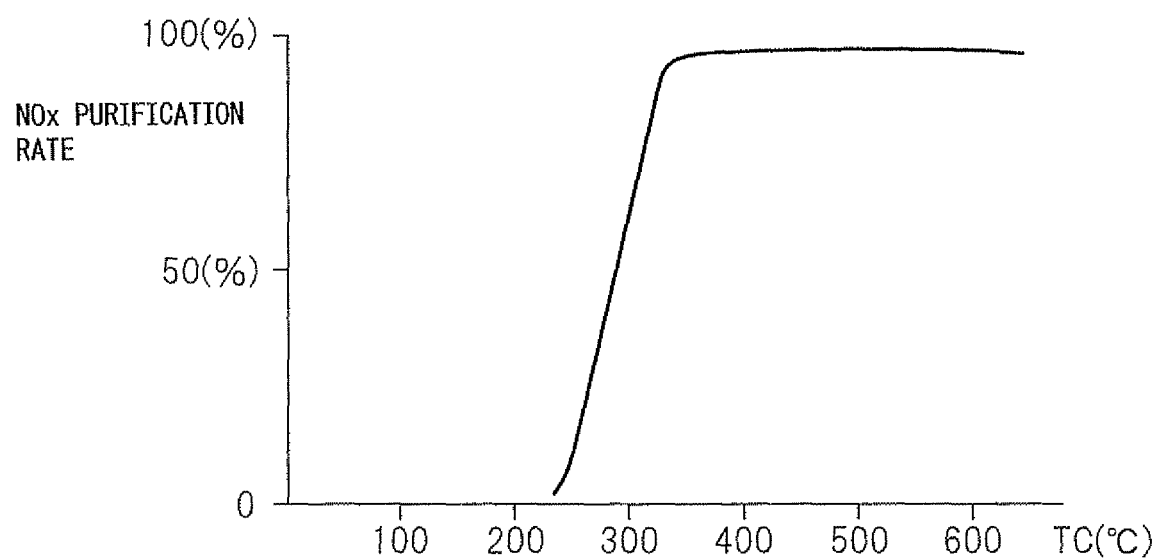
FIG. 5 is a view which shows an $NO_X$ purification rate of the first $NO_X$ purification method.

FIG. 5 is a graph which shows the relationship of the catalyst temperature of the exhaust purification catalyst and the $NO_X$ purification rate in the present embodiment. FIG. 5 shows the $NO_x$ purification rate with respect to the catalyst temperature TC of the exhaust purification catalyst 13 when periodically making the air-fuel ratio $(A/F)_{in}$ of the exhaust gas which flows into the exhaust purification catalyst 13 change as shown in FIG. 4. The inventors engaged in research relating to $NO_x$ purification for a long time. In the process of research, they learned that if making the concentration of hydrocarbons which flow into the exhaust purification catalyst 13 vibrate by within a predetermined range of amplitude and within a predetermined range of period, an extremely high $NO_x$ purification rate is obtained even in a 400° C. or higher high temperature region.

Furthermore, at this time, it is learned that a large amount of reducing intermediate containing nitrogen and hydrocarbons continues to be held on the surface of the basic layer 53, that is, on the basic exhaust gas flow surface part 54 of the exhaust purification catalyst 13. Furthermore, it is learned that this reducing intermediate plays a central role in obtaining a high $NO_x$ purification rate. Next, this will be explained with reference to FIG. 6A and FIG. 6B.

Figure 6A:
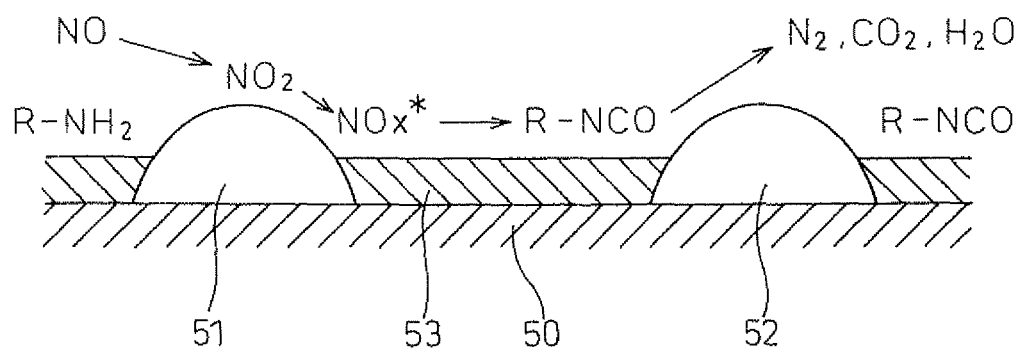
FIG. 6A and FIG. 6B are views for explaining an oxidation reduction reaction by an exhaust purification catalyst in the first $NO_X$ purification method.
Figure 6B:
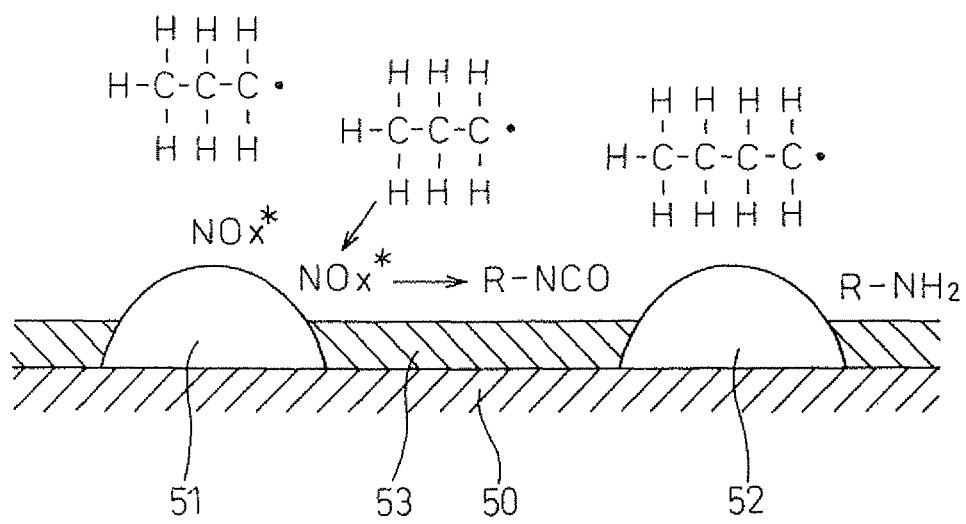

FIG. 6A and FIG. 6B schematically show a surface part of the catalyst carrier of the exhaust purification catalyst. FIG. 6A and FIG. 6B show the reaction which is presumed to occur when the concentration of hydrocarbons which flow into the exhaust purification catalyst is made to vibrate by within a predetermined range of amplitude and within a predetermined range of period. FIG. 6A shows the time when the concentration of hydrocarbons which flow into the exhaust purification catalyst 13 is low, while FIG. 6B shows the time when hydrocarbons are fed from the hydrocarbon feed valve 15 and the concentration of hydrocarbons which flow into the exhaust purification catalyst 13 becomes high.

Now, as will be understood from FIG. 4, the air-fuel ratio of the exhaust gas which flows into the exhaust purification catalyst 13 is maintained lean except for an instant. The exhaust gas which flows into the exhaust purification catalyst 13 normally becomes an oxygen-rich state. Therefore, the NO which is contained in the exhaust gas, as shown in FIG. 6A, is oxidized on the platinum catalyst particles 51 and becomes $NO_2$. Next, this $NO_2$ is further oxidized and becomes $NO_3$. Further, part of the $NO_2$ becomes $NO_2^-$. In this case, the amount of production of $NO_3$ is far greater than the amount of production of $NO_2^-$. Therefore, on the platinum catalyst particles 51, a large amount of $NO_3$ and a small amount of $NO_2^-$ are produced. These $NO_3$ and $NO_2^-$ are strong in activity. In the present invention, these $NO_3$ and $NO_2^-$ will be referred to as the "active $NO_x$" and shown by the symbol $NO_X^*$. The $NO_X$ is held on the surface of the basic layer 53 in the form of the active $NO_X$. That is, the $NO_X$ which is contained in the exhaust gas is held on the basic exhaust gas flow surface part 54.

On the other hand, if hydrocarbons are fed from the hydrocarbon feed valve 15, as shown in FIG. 3, the hydrocarbons are modified and become radicalized inside of the exhaust purification catalyst 13. As a result, as shown in FIG. 6B, the hydrogen concentration around the active $NO_x$ becomes higher. In this regard, if, after the active $NO_x$ is produced, the state of a high oxygen concentration around the active $NO_x$ continues for a constant time or more, the active $NO_x$ is oxidized and is absorbed in the form of nitrate ions $NO_3^-$ inside the basic layer 53. However, if, before this constant time elapses, the hydrocarbon concentration around the active $NO_x$ becomes higher, as shown in FIG. 6B, the active $NO_x$ reacts on the catalyst particles 51 with the radical hydrocarbons HC to thereby form the reducing intermediate. This reducing intermediate is held on the surface of the basic layer 53.

Note that, at this time, the first produced reducing intermediate is considered to be a nitro compound $R-NO_2$. If this nitro compound $R-NO_2$ is produced, the result becomes a nitrile compound R—CN. This nitrile compound R—CN can only survive for an instant in this state, so immediately becomes an isocyanate compound R—NCO. This isocyanate compound R—NCO, if hydrolyzed, becomes an amine compound $R-NH_2$. However, in this case, what is hydrolyzed is considered to be part of the isocyanate compound R—NCO. Therefore, as shown in FIG. 6B, the majority of the reducing intermediate which is held on the surface of the basic layer 53 is believed to be the isocyanate compound R—NCO and amine compound $R-NH_2$.

On the other hand, as shown in FIG. 6B, if the produced reducing intermediate is surrounded by the hydrocarbons HC, the reducing intermediate is blocked by the hydrocarbons HC and the reaction will not proceed any further. In this case, the concentration of hydrocarbons which flow into the exhaust purification catalyst 13 is lowered and thereby the oxygen concentration becomes higher. If this happens, the hydrocarbons around the reducing intermediate will be oxidized. As a result, as shown in FIG. 6A, the reducing intermediate and the active $NO_x$ react. At this time, the active $NO_x$ reacts with the reducing intermediate R—NCO or $R-NH_2$ to become $N_2$, $CO_2$, $H_2O$, therefore the $NO_x$ is removed.

In this way, in the exhaust purification catalyst 13, by making the concentration of hydrocarbons which flow into the exhaust purification catalyst 13 higher, a reducing intermediate is produced. The concentration of hydrocarbons which flow into the exhaust purification catalyst 13 is lowered and the oxygen concentration is raised so that the active $NO_x$ reacts with the reducing intermediate and the $NO_x$ is removed. That is, in order for the exhaust purification catalyst 13 to remove the $NO_x$, the concentration of hydrocarbons which flow into the exhaust purification catalyst 13 has to be periodically changed.

Of course, in this case, it is necessary to raise the concentration of hydrocarbons to a concentration sufficiently high for producing the reducing intermediate and it is necessary to lower the concentration of hydrocarbons to a concentration sufficiently low for making the produced reducing intermediate react with the active $NO_x$. That is, it is necessary to make the concentration of hydrocarbons which flow into the exhaust purification catalyst 13 vibrate by within a predetermined range of amplitude. Note that, in this case, it is necessary to hold a sufficient amount of reducing intermediate R—NCO or R—NH$_2$ on the basic layer 53, that is, the basic exhaust gas flow surface part 54, until the produced reducing intermediate reacts with the active $NO_x$. For this reason, the basic exhaust gas flow surface part 54 is provided.

On the other hand, if lengthening the feed period of the hydrocarbons, the time in which the oxygen concentration becomes high becomes longer in the period after the hydrocarbons are fed until the hydrocarbons are next fed. Therefore, the active $NO_x$ is absorbed in the basic layer 53 in the form of nitrates without producing a reducing intermediate. To avoid this, it is necessary to make the concentration of hydrocarbons which flow into the exhaust purification catalyst 13 vibrate by within a predetermined range of period.

Therefore, in an embodiment of the present invention, to make the $NO_x$ which is contained in the exhaust gas and the modified hydrocarbons react and produce the reducing intermediate R—NCO or R—NH$_2$ containing nitrogen and hydrocarbons, the precious metal catalyst particles 51 and 52 are carried on the exhaust gas flow surface of the exhaust purification catalyst 13. To hold the produced reducing intermediate R—NCO or R—NH$_2$ inside the exhaust purification catalyst 13, the basic exhaust gas flow surface part 54 is formed around the precious metal catalyst 51 and 52. Due to the reducing action of the reducing intermediate R—NCO or R—NH$_2$ which is held on the basic exhaust gas flow surface part 54, the $NO_x$ is reduced. The vibration period of the hydrocarbon concentration is made the vibration period required for continuation of the production of the reducing intermediate R—NCO or R—NH$_2$. Incidentally, in the example shown in FIG. 4, the injection interval is made 3 seconds.

Figure 7A:
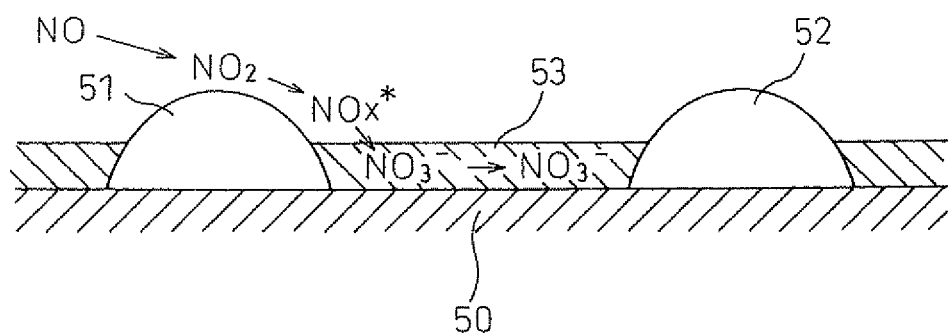
FIG. 7A and FIG. 7B are views for explaining an oxidation reduction reaction by an exhaust purification catalyst in a second $NO_X$ purification method.

If the vibration period of the hydrocarbon concentration, that is, the feed period of the hydrocarbons HC, is made longer than the above predetermined range of period, the reducing intermediate R—NCO or R—NH$_2$ disappears from the surface of the basic layer 53. At this time, the active $NO_x$ which was produced on the catalyst particles 51, as shown in FIG. 7A, diffuses in the basic layer 53 in the form of nitrate ions $NO_3^-$ and becomes nitrates. That is, at this time, the $NO_x$ in the exhaust gas is absorbed in the form of nitrates inside of the basic layer 53.

Figure 7B:
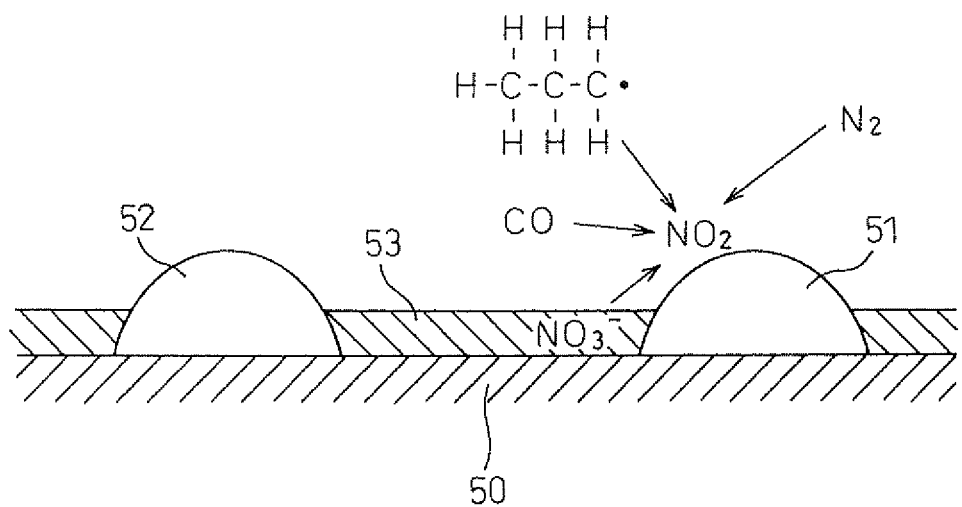

On the other hand, FIG. 7B shows the case where the air-fuel ratio of the exhaust gas which flows into the exhaust purification catalyst 13 is made the stoichiometric air-fuel ratio or rich when the $NO_x$ is absorbed in the form of nitrates inside of the basic layer 53. In this case, the oxygen concentration in the exhaust gas falls, so the reaction proceeds in the opposite direction ($NO_3^- \rightarrow NO_2$), and consequently the nitrates absorbed in the basic layer 53 gradually become nitrate ions $NO_3^-$ and, as shown in FIG. 7B, are released from the basic layer 53 in the form of $NO_2$. Next, the released $NO_2$ is reduced by the hydrocarbons HC and CO contained in the exhaust gas.

Figure 8:
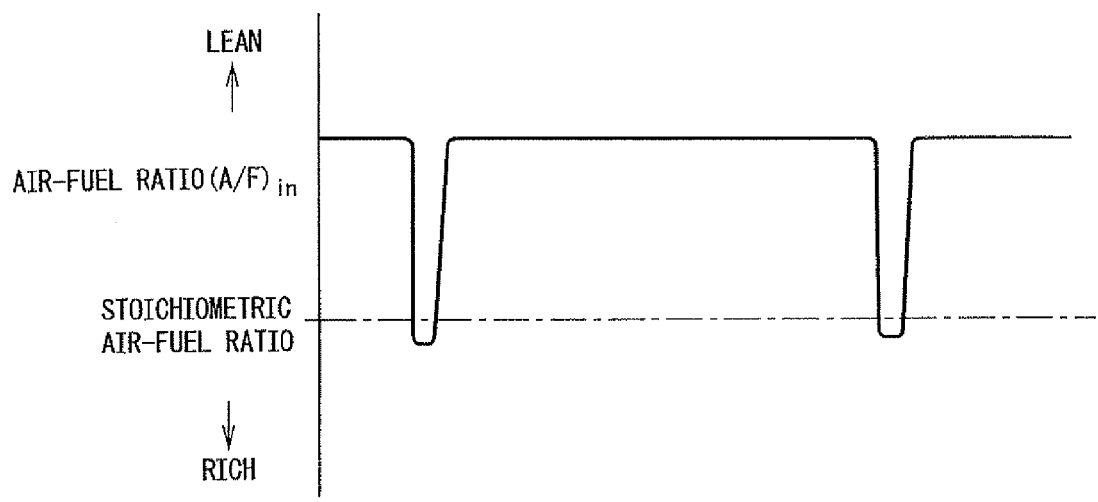
FIG. 8 is a view which shows a change of an air-fuel ratio of exhaust gas which flows into an exhaust purification catalyst in the second $NO_X$ purification method.

FIG. 8 shows the case of making the air-fuel ratio $(A/F)_{in}$ of the exhaust gas which flows into the exhaust purification catalyst temporarily rich slightly before the $NO_x$ absorption ability of the basic layer becomes saturated. Note that, in the example which is shown in FIG. 8, the time interval of this rich control is 1 minute or more. In this case, the $NO_x$ which was absorbed at the basic layer 53 when the air-fuel ratio $(A/F)_{in}$ of the exhaust gas was lean is released all at once and reduced from the basic layer 53 when the air-fuel ratio $(A/F)_{in}$ of the exhaust gas is made temporarily rich. Therefore, in this case, the basic layer 53 performs the role of an absorbent for temporarily absorbing the $NO_x$.

Note that, at this time, sometimes the basic layer 53 temporarily adsorbs $NO_x$. Therefore, if using the term "storage" as a term including both absorption and adsorption, at this time, the basic layer 53 performs the role of an $NO_x$ storage agent for temporarily storing $NO_x$. That is, in this case, the exhaust purification catalyst 13 functions as an $NO_x$ storage catalyst which stores $NO_x$ when the air-fuel ratio of the exhaust gas is lean and releases the stored $NO_x$ when the oxygen concentration in the exhaust gas falls.

Figure 9:
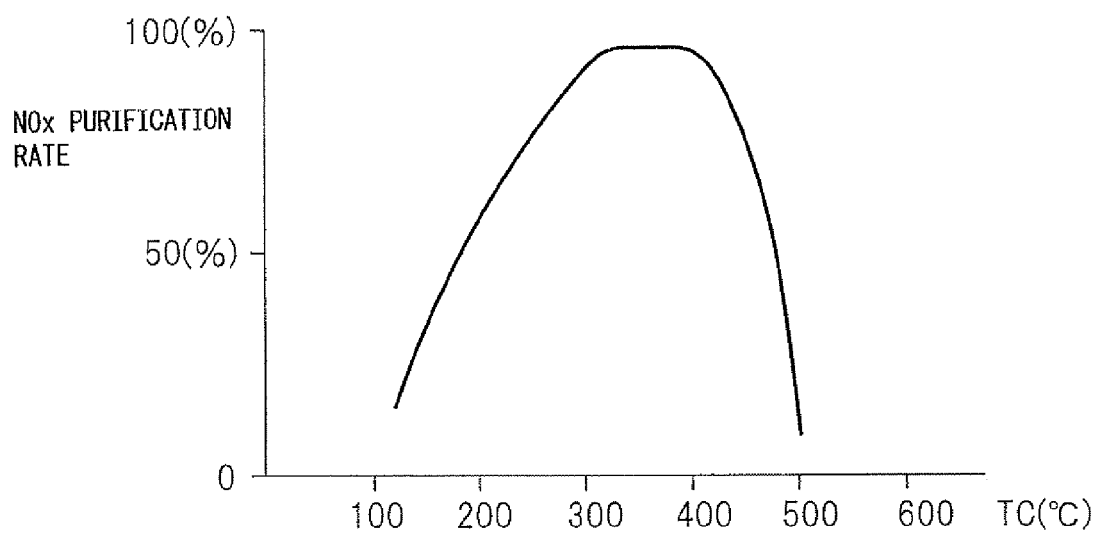
FIG. 9 is a view which shows an $NO_X$ purification rate of the second $NO_X$ purification method.

FIG. 9 shows the $NO_x$ purification rate when making the exhaust purification catalyst function as an $NO_x$ storage catalyst. Note that, the abscissa of FIG. 9 indicates the catalyst temperature TC of the exhaust purification catalyst 13. When making the exhaust purification catalyst 13 function as an $NO_x$ storage catalyst, an extremely high $NO_x$ purification rate is obtained when the catalyst temperature TC is 300° C. to 400° C., but when the catalyst temperature TC becomes a 400° C. or higher high temperature, the $NO_x$ purification rate falls.

In this way, when the catalyst temperature TC becomes 400° C. or more, the $NO_x$ purification rate falls because if the catalyst temperature TC becomes 400° C. or more, the nitrates break down by heat and are released in the form of $NO_2$ from the exhaust purification catalyst 13. That is, so long as storing $NO_x$ in the form of nitrates, when the catalyst temperature TC is high, it is difficult to obtain a high $NO_x$ purification rate. However, in the new $NO_x$ purification method shown from FIG. 4 to FIGS. 6A and 6B, as will be understood from FIGS. 6A and 6B, nitrates are not formed or even if formed are extremely small in amount, consequently, as shown in FIG. 5, even when the catalyst temperature TC is high, a high $NO_x$ purification rate is obtained.

Therefore, in the present invention, a hydrocarbon feed valve 15 for feeding hydrocarbons is arranged inside of an engine exhaust passage, an exhaust purification catalyst 13 for causing $NO_x$ which is contained in exhaust gas and modified hydrocarbons to react is arranged downstream of the hydrocarbon feed valve 15 in the engine exhaust passage, precious metal catalyst particles 51 and 52 are carried on the exhaust gas flow surface of the exhaust purification catalyst 13, a basic exhaust gas flow surface part 54 is formed around the precious metal catalyst particles 51 and 52, the exhaust purification catalyst 13 has the property of reducing the $NO_x$ which is contained in exhaust gas if the concentration of hydrocarbons which flow into the exhaust purification catalyst 13 is made to vibrate by within a predetermined range of amplitude and within a predetermined range of period and has the property of the storage amount of $NO_x$ which is contained in exhaust gas increasing if the vibration period of the hydrocarbon concentration is made longer than the predetermined range, and, at the time of engine operation, the concentration of hydrocarbons which flow into the exhaust purification catalyst 13 is made to vibrate by within the predetermined range of amplitude and within the predetermined range of period to thereby reduce the $NO_x$ which is contained in the exhaust gas in the exhaust purification catalyst 13.

That is, the $NO_x$ purification method which is shown from FIG. 4 to FIGS. 6A and 6B can be said to be a new $NO_x$ purification method designed to remove $NO_x$ without forming almost any nitrates in the case of using an exhaust purification catalyst which carries precious metal catalyst particles and forms a basic layer which can absorb $NO_x$. In actuality, when using this new $NO_x$ purification method, the nitrates which are detected from the basic layer 53 become much smaller in amount compared with the case where making the exhaust purification catalyst 13 function as an $NO_x$ storage catalyst. Note that, this new $NO_x$ purification method will be referred to below as the "first $NO_x$ purification method".

Next, referring to FIG. 10 to FIG. 15, this first $NO_x$ purification method will be explained in a bit more detail.

Figure 10:
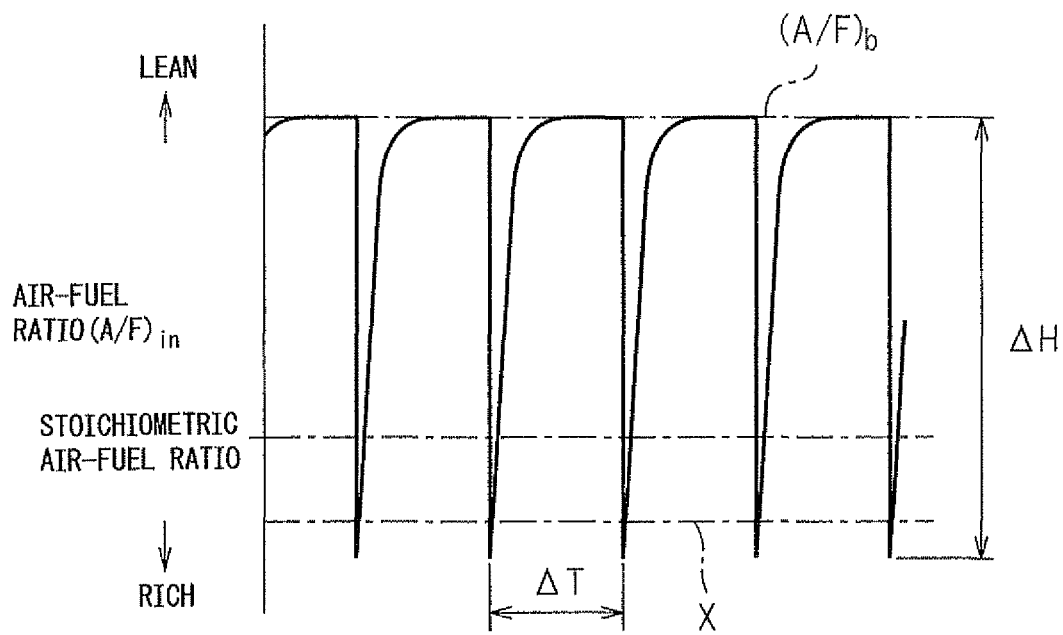
FIG. 10 is a time chart which shows a change of an air-fuel ratio of exhaust gas which flows into an exhaust purification catalyst in the first $NO_X$ purification method.

FIG. 10 shows enlarged the change in the air-fuel ratio $(A/F)_{in}$ shown in FIG. 4. Note that, as explained above, the change in the air-fuel ratio $(A/F)_{in}$ of the exhaust gas which flows into this exhaust purification catalyst 13 simultaneously shows the change in concentration of the hydrocarbons which flow into the exhaust purification catalyst 13. Note that, in FIG. 10, $\Delta H$ shows the amplitude of the change in concentration of hydrocarbons HC which flow into the exhaust purification catalyst 13, while $\Delta T$ shows the vibration period of the concentration of the hydrocarbons which flow into the exhaust purification catalyst 13.

Furthermore, in FIG. 10, $(A/F)_b$ shows the base air-fuel ratio which shows the air-fuel ratio of the combustion gas for generating the engine output. In other words, this base air-fuel ratio $(A/F)_b$ shows the air-fuel ratio of the exhaust gas which flows into the exhaust purification catalyst 13 when stopping the feed of hydrocarbons. On the other hand, in FIG. 10, X shows the upper limit of the air-fuel ratio $(A/F)_{in}$ used for producing the reducing intermediate without the produced active $NO_x$ being stored in the form of nitrates inside the basic layer 53 much at all. To make the active $NO_x$ and the modified hydrocarbons react to produce a reducing intermediate, the air-fuel ratio $(A/F)_{in}$ has to be made lower than this upper limit X of the air-fuel ratio.

In other words, in FIG. 10, X shows the lower limit of the concentration of hydrocarbons required for making the active $NO_x$ and modified hydrocarbons react to produce a reducing intermediate. To produce the reducing intermediate, the concentration of hydrocarbons has to be made higher than this lower limit X. In this case, whether the reducing intermediate is produced is determined by the ratio of the oxygen concentration and hydrocarbon concentration around the active $NO_x$, that is, the air-fuel ratio $(A/F)_{in}$. The upper limit X of the air-fuel ratio which is required for producing the reducing intermediate will below be called the "requested minimum air-fuel ratio".

In the example shown in FIG. 10, the requested minimum air-fuel ratio X is rich, therefore, in this case, to form the reducing intermediate, the air-fuel ratio $(A/F)_{in}$ is instantaneously made the requested minimum air-fuel ratio X or less, that is, rich. As opposed to this, in the example shown in FIG. 11, the requested minimum air-fuel ratio X is lean. In this case, the air-fuel ratio $(A/F)_{in}$ is maintained lean while periodically reducing the air-fuel ratio $(A/F)_{in}$ so as to form the reducing intermediate.

In this case, whether the requested minimum air-fuel ratio X becomes rich or becomes lean depends on the oxidizing strength of the exhaust purification catalyst 13. In this case, the exhaust purification catalyst 13, for example, becomes stronger in oxidizing strength if increasing the carried amount of the precious metal catalyst particles 51 and becomes stronger in oxidizing strength if strengthening the acidity. Therefore, the oxidizing strength of the exhaust purification catalyst 13 changes due to the carried amount or the strength of the acidity of the precious metal 51.

Figure 11:
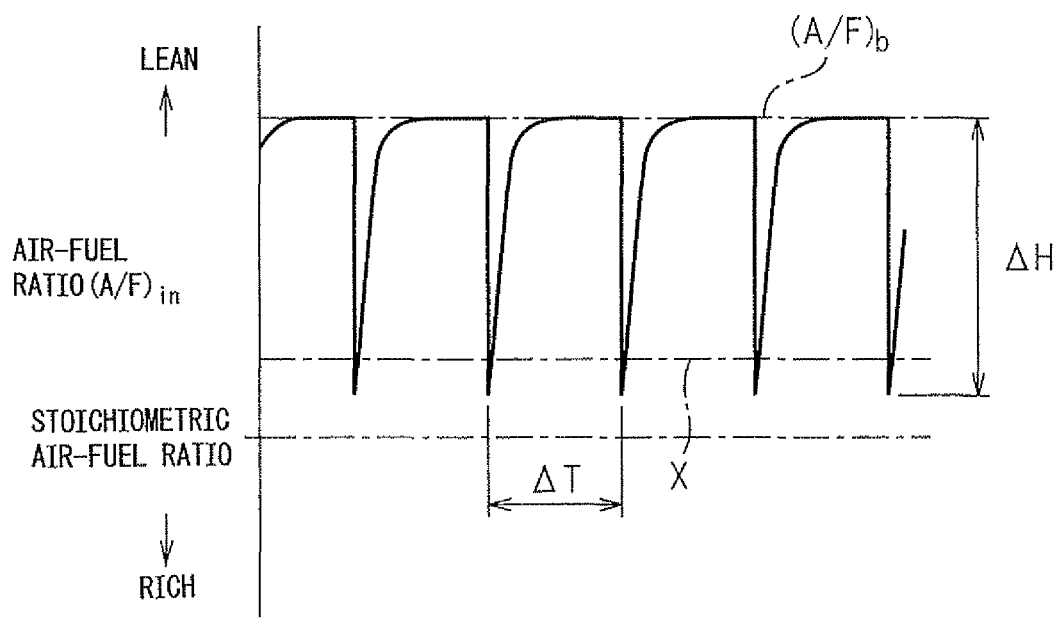
FIG. 11 is another time chart which shows a change of an air-fuel ratio of exhaust gas which flows into an exhaust purification catalyst in the first $NO_X$ purification method.

Now, if using an exhaust purification catalyst 13 with a strong oxidizing strength, as shown in FIG. 11, if maintaining the air-fuel ratio $(A/F)_{in}$ lean while periodically lowering the air-fuel ratio $(A/F)_{in}$, the hydrocarbons end up becoming completely oxidized when the air-fuel ratio $(A/F)_{in}$ is reduced. As a result, the reducing intermediate can no longer be produced. As opposed to this, when using an exhaust purification catalyst 13 with a strong oxidizing strength, as shown in FIG. 10, if making the air-fuel ratio $(A/F)_{in}$ periodically rich, when the air-fuel ratio $(A/F)_{in}$ is made rich, the hydrocarbons will not be completely oxidized, but will be partially oxidized, that is, the hydrocarbons will be modified, consequently the reducing intermediate will be produced. Therefore, when using an exhaust purification catalyst 13 with a strong oxidizing strength, the requested minimum air-fuel ratio X has to be made rich.

On the other hand, when using an exhaust purification catalyst 13 with a weak oxidizing strength, as shown in FIG. 11, if maintaining the air-fuel ratio $(A/F)_{in}$ lean while periodically lowering the air-fuel ratio $(A/F)_{in}$, the hydrocarbons will not be completely oxidized, but will be partially oxidized, that is, the hydrocarbons will be modified, and consequently the reducing intermediate will be produced. As opposed to this, when using an exhaust purification catalyst 13 with a weak oxidizing strength, as shown in FIG. 10, if making the air-fuel ratio $(A/F)_{in}$ periodically rich, a large amount of hydrocarbons will be exhausted from the exhaust purification catalyst 13 without being oxidized and consequently the amount of hydrocarbons which is wastefully consumed will increase. Therefore, when using an exhaust purification catalyst 13 with a weak oxidizing strength, the requested minimum air-fuel ratio X has to be made lean.

Figure 12:
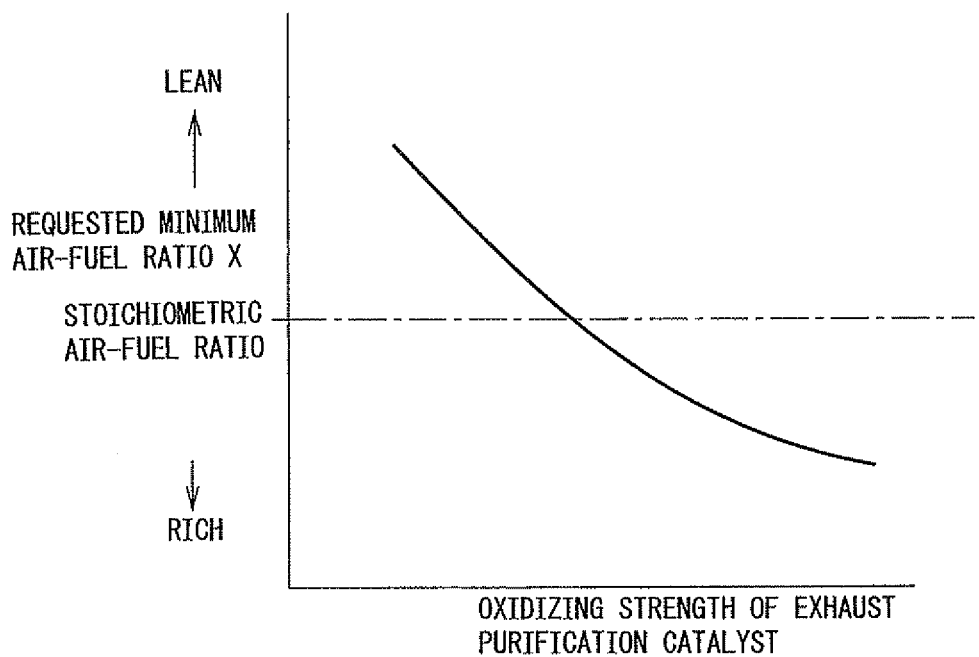
FIG. 12 is a view which shows the relationship between an oxidizing strength of an exhaust purification catalyst and a requested minimum air-fuel ratio X in the first $NO_X$ purification method.

That is, it is learned that the requested minimum air-fuel ratio X, as shown in FIG. 12, has to be reduced the stronger the oxidizing strength of the exhaust purification catalyst 13. In this way the requested minimum air-fuel ratio X becomes lean or rich due to the oxidizing strength of the exhaust purification catalyst 13. Below, taking as example the case where the requested minimum air-fuel ratio X is rich, the amplitude of the change in concentration of hydrocarbons flowing into the exhaust purification catalyst 13 and the vibration period of the concentration of hydrocarbons flowing into the exhaust purification catalyst 13 will be explained.

Now, if the base air-fuel ratio $(A/F)_b$ becomes larger, that is, if the oxygen concentration in the exhaust gas before the hydrocarbons are fed becomes higher, the feed amount of hydrocarbons required for making the air-fuel ratio $(A/F)_{in}$ the requested minimum air-fuel ratio X or less increases and along with this the excess amount of hydrocarbons which did not contribute the production of the reducing intermediate also increases. In this case, to remove the $NO_x$ well, as explained above, it is necessary to make the excess hydrocarbons oxidize. Therefore, to remove the $NO_x$ well, the larger the amount of excess hydrocarbons, the larger the amount of oxygen which is required.

In this case, if raising the oxygen concentration in the exhaust gas, the amount of oxygen can be increased. Therefore, to remove the $NO_x$ well, when the oxygen concentration in the exhaust gas before the hydrocarbons are fed is high, it is necessary to raise the oxygen concentration in the exhaust gas after feeding the hydrocarbons. That is, the higher the oxygen concentration in the exhaust gas before the hydrocarbons are fed, the larger the amplitude of the hydrocarbon concentration has to be made.

Figure 13:
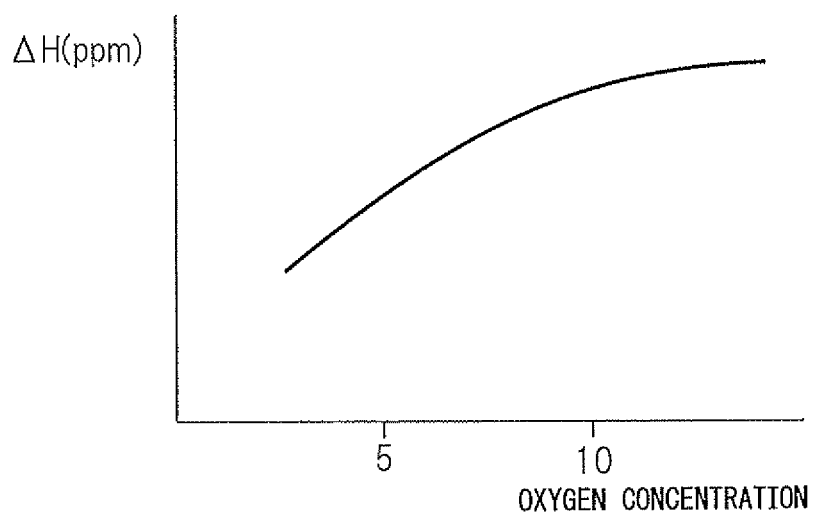
FIG. 13 is a view which shows the relationship between an oxygen concentration in exhaust gas and an amplitude $\Delta H$ of a hydrocarbon concentration giving the same $NO_X$ purification rate in the first $NO_X$ purification method.

FIG. 13 shows the relationship between the oxygen concentration in the exhaust gas before the hydrocarbons are fed and the amplitude ΔH of the hydrocarbon concentration when the same $NO_x$ purification rate is obtained. To obtain the same $NO_x$ purification rate from FIG. 13, it is learned that the higher the oxygen concentration in the exhaust gas before the hydrocarbons are fed, the greater the amplitude ΔH of the hydrocarbon concentration has to be made. That is, to obtain the same $NO_x$ purification rate, the higher the base air-fuel ratio $(A/F)_b$, the greater the amplitude ΔH of the hydrocarbon concentration has to be made. In other words, to remove the $NO_x$ well, the lower the base air-fuel ratio $(A/F)_b$, the more the amplitude ΔH of the hydrocarbon concentration can be reduced.

Figure 14:
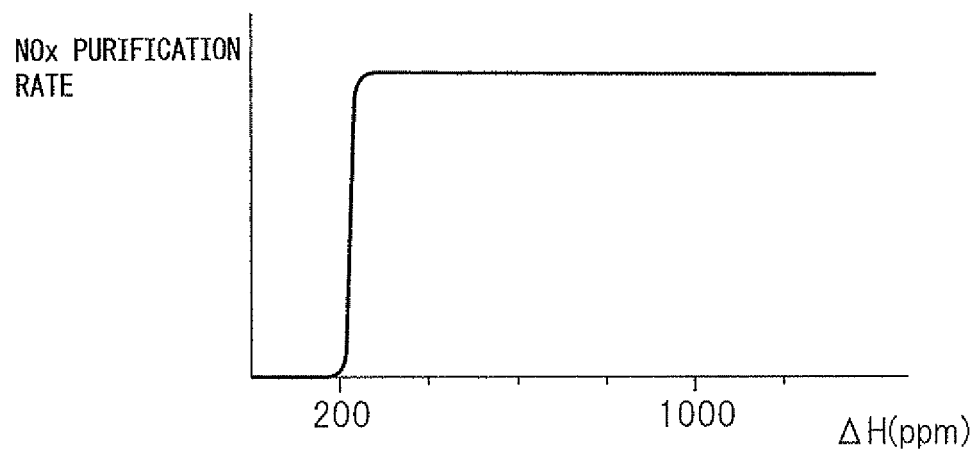
FIG. 14 is a view which shows a relationship between an amplitude $\Delta H$ of a hydrocarbon concentration and an $NO_X$ purification rate in the first $NO_X$ purification method.

In this regard, the base air-fuel ratio $(A/F)_b$ becomes the lowest at the time of an acceleration operation. At this time, if the amplitude ΔH of the hydrocarbon concentration is about 200 ppm, it is possible to remove the $NO_x$ well. The base air-fuel ratio $(A/F)_b$ is normally larger than the time of acceleration operation. Therefore, as shown in FIG. 14, if the amplitude ΔH of the hydrocarbon concentration is 200 ppm or more, an excellent $NO_x$ purification rate can be obtained.

On the other hand, it is learned that when the base air-fuel ratio $(A/F)_b$ is the highest, if making the amplitude ΔH of the hydrocarbon concentration 10000 ppm or so, an excellent $NO_x$ purification rate is obtained. Therefore, in the present invention, the predetermined range of the amplitude of the hydrocarbon concentration is made 200 ppm to 10000 ppm.

Figure 15:
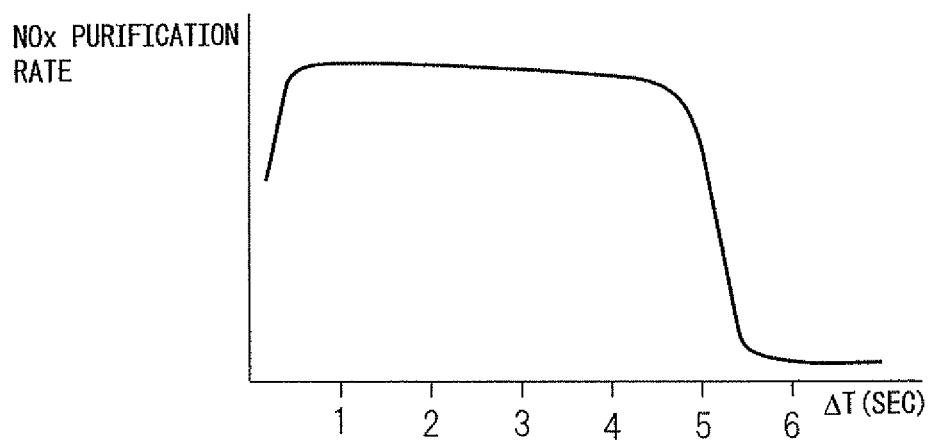
FIG. 15 is a view which shows a relationship between a vibration period $\Delta T$ of a hydrocarbon concentration and an $NO_X$ purification rate in the first $NO_X$ purification method.

Further, if the vibration period ΔT of the hydrocarbon concentration becomes longer, in the interval from when hydrocarbons are supplied to when hydrocarbons are next supplied, the concentration of oxygen around the active $NO_X$ will become higher. In this case, if the vibration period ΔT of the hydrocarbon concentration becomes longer than about 5 seconds, the active $NO_X$ will start to be absorbed in the form of nitrates inside the basic layer 53. Therefore, as shown in FIG. 15, if the vibration period ΔT of the hydrocarbon concentration becomes longer than 5 seconds or so, the $NO_X$ purification rate will fall. Therefore the vibration period ΔT of the hydrocarbon concentration has to be made 5 seconds or less.

On the other hand, if the vibration period ΔT of the hydrocarbon concentration becomes about 0.3 second or less, the fed hydrocarbons start to build up on the exhaust gas flow surface of the exhaust purification catalyst 13, therefore, as shown in FIG. 15, if the vibration period ΔT of the hydrocarbon concentration becomes about 0.3 second or less, the $NO_x$ purification rate falls. Therefore, in the present invention, the vibration period of the hydrocarbon concentration is made from 0.3 second to 5 seconds.

Next, while referring to FIG. 16 to FIG. 19, the $NO_X$ purification method when making the exhaust purification catalyst function as an $NO_X$ storage catalyst will be specifically explained. In the present invention, the $NO_X$ purification method in the case of making the exhaust purification catalyst 13 function as an $NO_X$ storage catalyst will be referred to as "the second $NO_X$ purification method".

Figure 16:
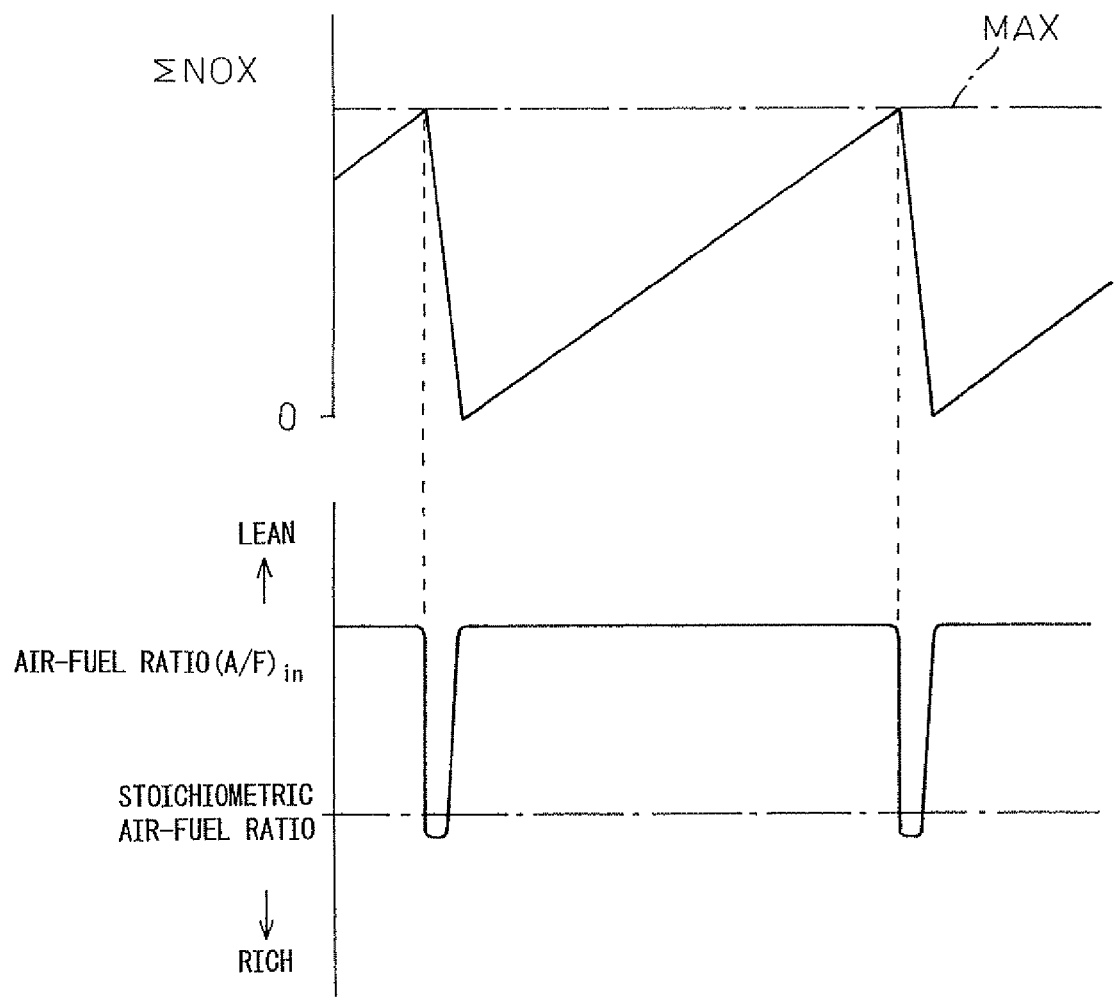
FIG. 16 is view which shows a change in the air-fuel ratio of the exhaust gas which flows into the exhaust purification catalyst, etc., in the second $NO_X$ purification method.

FIG. 16 shows a time chart of the time when removing $NO_X$ by the second purification method. In the second $NO_X$ purification method, when the stored $NO_X$ amount ΣNOX which is stored in the basic layer 53 exceeds a predetermined allowable amount MAX, the air-fuel ratio $(A/F)_{in}$ of the exhaust gas which flows into the exhaust purification catalyst 13 is temporarily made rich. If the air-fuel ratio $(A/F)_{in}$ of the exhaust gas is made rich, the $NO_X$ which is stored in the basic layer 53 when the air-fuel ratio $(A/F)_{in}$ of the exhaust gas is lean, is released all at once and reduced from the basic layer 53. Due to this, the $NO_X$ is removed.

Figure 17:
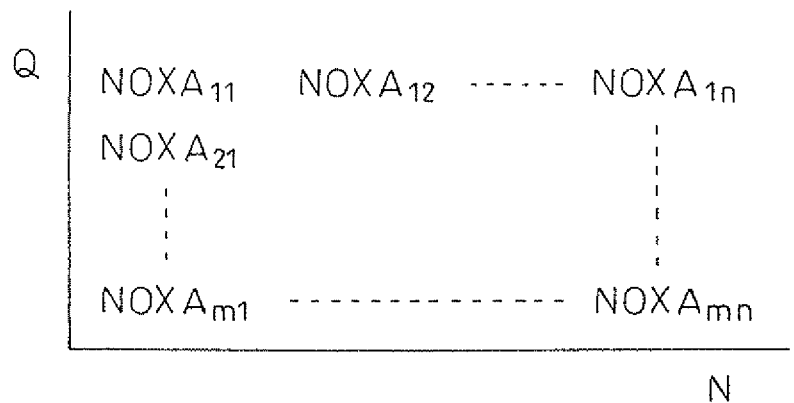
FIG. 17 is a view which shows a map of an exhausted $NO_X$ amount NOXA.

The stored $NO_x$ amount ΣNOX is, for example, calculated from the amount of $NO_x$ which is exhausted from the engine. In this embodiment according to the present invention, the exhausted $NO_x$ amount NOXA of $NO_x$ which is exhausted from the engine per unit time is stored as a function of the injection amount Q and engine speed N in the form of a map such as shown in FIG. 17 in advance in the ROM 32. The stored $NO_x$ amount ΣNOX is calculated from the exhausted $NO_x$ amount NOXA. In this case, as explained before, the period in which the air-fuel ratio $(A/F)_{in}$ of the exhaust gas is made rich is usually 1 minute or more.

Figure 18:
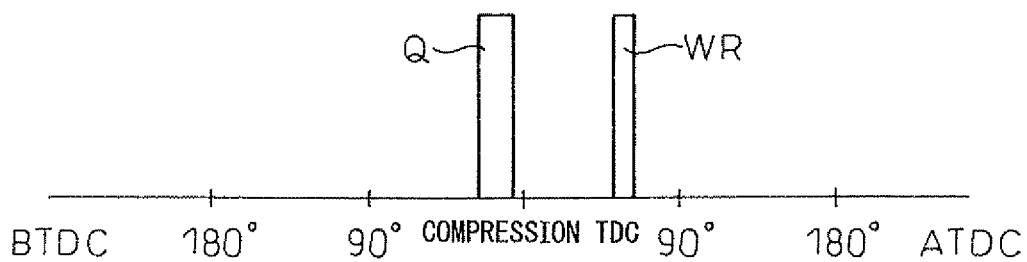
FIG. 18 is a view which shows a fuel injection timing in a combustion chamber in the second $NO_X$ purification method.
Figure 19:
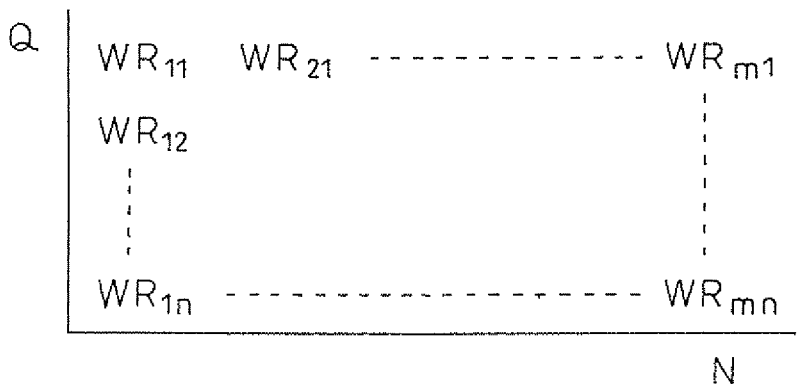
FIG. 19 is a view which shows a map of the feed amount of hydrocarbons WR in the second $NO_X$ purification method.

In this second $NO_x$ purification method, as shown in FIG. 18, in a combustion chamber 2, a fuel injector 3 injects additional fuel WR in addition to the combustion-use fuel Q so that the air-fuel ratio $(A/F)_{in}$ of the exhaust gas flowing into the exhaust purification catalyst 13 is made rich. Note that, FIG. 18, the abscissa indicates the crank angle. This additional fuel WR is injected at a timing at which it will burn, but will not appear as engine output, that is, slightly before ATDC90° after compression top dead center. This fuel amount WR is stored as a function of the injection amount Q and engine speed N in the form of a map such as shown in FIG. 19 in advance in the ROM 32. Of course, in this case, it is also possible to make the feed amount of hydrocarbons from the hydrocarbon feed valve 15 increase so as to make the air-fuel ratio $(A/F)_{in}$ of the exhaust gas rich.

Now, returning again to the explanation of the first $NO_x$ purification method, to use the first $NO_x$ purification method to remove the $NO_x$ well as explained before, the amplitude ΔH and vibration period ΔT of the hydrocarbon concentration have to be suitably controlled. That is, to use the first $NO_x$ purification method to remove the $NO_x$ well, the air-fuel ratio $(A/F)_{in}$ of the exhaust gas which flows into the exhaust purification catalyst 13 has to be made the requested minimum air-fuel ratio X or less by control of the amplitude ΔH of the hydrocarbon concentration and by control of the vibration period ΔT of the hydrocarbon concentration to 0.3 second to 5 seconds.

In this case, in the present invention, the amplitude ΔH of the hydrocarbon concentration is controlled by controlling the injection amount of hydrocarbons from the hydrocarbon feed valve 15, while the vibration period ΔT of the hydrocarbon concentration is controlled by controlling the injection period of hydrocarbons from the hydrocarbon feed valve 15. Note that, in this case, the injection amount of hydrocarbons from the hydrocarbon feed valve 15 can be controlled by changing at least one of the hydrocarbon injection time or injection pressure from the hydrocarbon feed valve 15.

Referring to FIG. 6A and FIG. 6B, as explained earlier, in the first $NO_X$ purification method, active $NO_X$ is formed in the state where the exhaust gas which flows into the exhaust purification catalyst 13 is oxygen rich. By having the active $NO_X$ held on the surface of the basic layer 53, the $NO_X$ which is contained in the exhaust gas can be removed. By feeding hydrocarbons from the hydrocarbon feed valve 15, radical type hydrocarbons are produced. Furthermore, by having the radical type hydrocarbons and active $NO_X$ react, a reducing intermediate is produced. By having the produced reducing intermediate and active $NO_X$ react, the $NO_X$ is reduced to nitrogen.

In this regard, there is a limit to the holding ability of the exhaust purification catalyst 13 which holds the $NO_X$ in the exhaust gas on the surface of the basic layer. If the holding ability becomes smaller, the $NO_X$ can no longer be sufficiently removed from the exhaust gas. In the present embodiment, the holding ability for holding the $NO_X$ in the exhaust gas on the surface of the basic layer of the exhaust purification catalyst is estimated and, when the estimated holding ability becomes less than a predetermined judgment value of the holding ability, control is performed to make the concentration of hydrocarbons which flow into the exhaust purification catalyst rise. In the present embodiment, hydrocarbons are fed from the hydrocarbon feed valve to make the concentration of hydrocarbons which flow into the exhaust purification catalyst rise.

For example, there is a limit to the held active $NO_X$ amount of the exhaust purification catalyst 13. The larger the held active $NO_X$ amount, the less the speed of holding the $NO_X$ which is contained in the exhaust, that is, the $NO_X$ holding speed falls. If the $NO_X$ holding speed falls, the amount of $NO_X$ which cannot be held at the exhaust purification catalyst and slips through the exhaust purification catalyst increases. In this way, if the $NO_X$ holding speed falls, the $NO_X$ purification rate falls.

The exhaust purification catalyst 13 in the present embodiment has a maximum amount of $NO_X$ which it can hold per unit time, that is, a holdable speed. That is, the holdable speed is the maximum speed by which $NO_X$ in the exhaust gas can be held on the surface of the basic layer of the exhaust purification catalyst. The holdable speed is dependent on the state of the exhaust purification catalyst, the operating state of the engine body, and other aspects of the operating state of the internal combustion engine.

In the operational control of the exhaust purification system in the present embodiment, the holdable speed is estimated during the time period when the first $NO_X$ purification method is being performed. The estimated holdable speed is used as the basis to estimate the holding ability of the exhaust purification catalyst 13. The estimated holding ability is used as the basis to set the timing for feed of hydrocarbons from the hydrocarbon feed valve 15. Control is performed to feed hydrocarbons from the hydrocarbon feed valve 15 and cause the reducing intermediate and the held active $NO_X$ to react so as to remove the $NO_X$ which is held on the exhaust purification catalyst 13.

The $NO_X$ holding ability of the exhaust purification catalyst 13, for example, includes the $NO_X$ purification rate of the exhaust purification catalyst 13. First, the control for feed of hydrocarbons from the hydrocarbon feed valve when the $NO_X$ which flows into the exhaust purification catalyst can no longer be removed by a predetermined purification rate will be explained.

Figure 20:
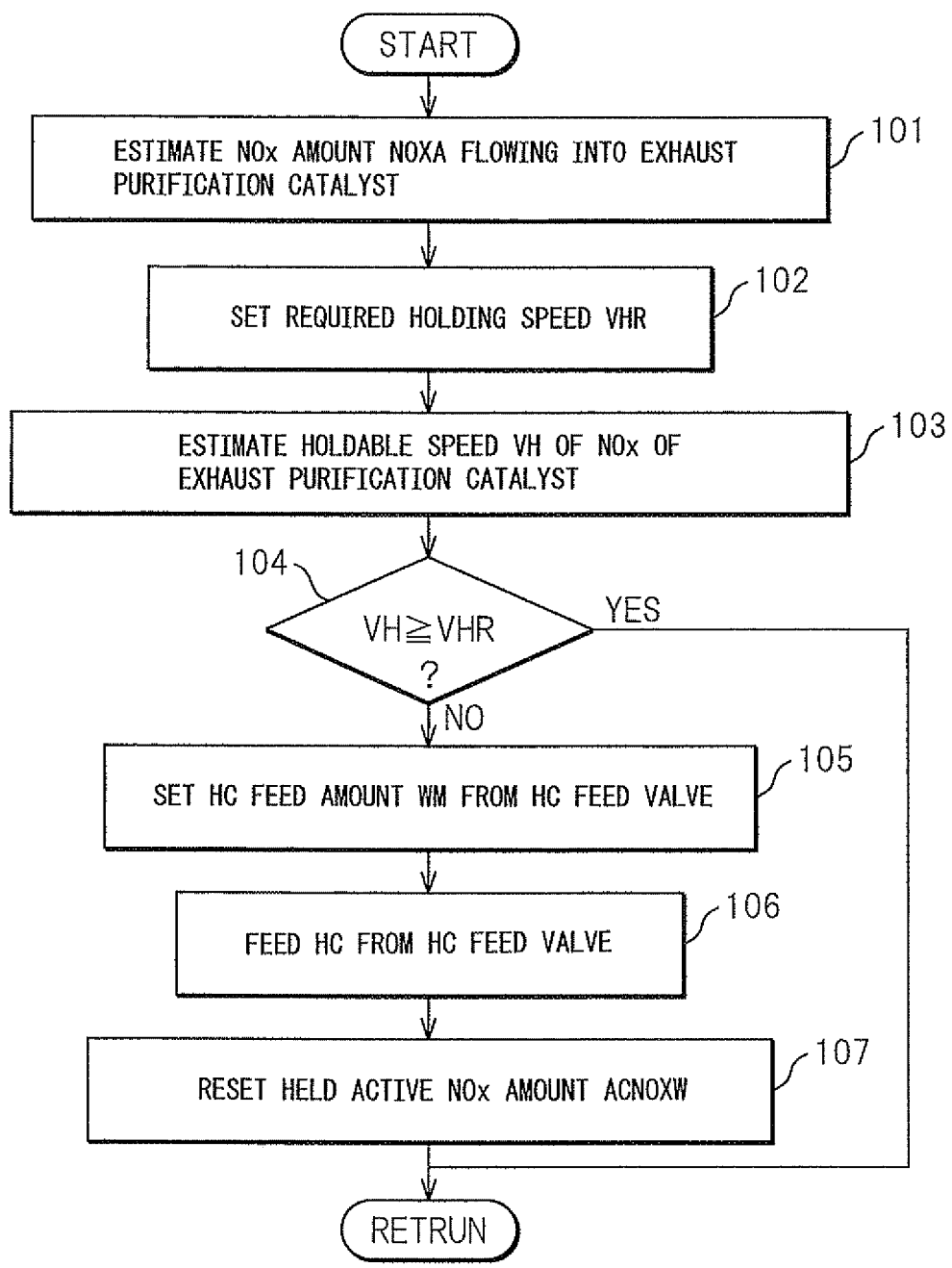
FIG. 20 is a flowchart of operational control of the first $NO_X$ purification method in an embodiment.

FIG. 20 is a flowchart of operational control of an exhaust purification system of an internal combustion engine in the present embodiment. The control which is shown in FIG. 20 can for example be performed repeatedly every predetermined time interval.

At step 101, the $NO_X$ amount NOXA which flows into the exhaust purification catalyst per unit time is estimated. In the present embodiment, the $NO_X$ amount which flows into the exhaust purification catalyst per unit time becomes equal to the $NO_X$ amount NOXA which is exhausted from the engine body per unit time. For this reason, the $NO_X$ amount NOXA which flows into the exhaust purification catalyst 3 per unit time can, for example, be estimated by a map which is shown in FIG. 17 as a function of the engine speed N and the fuel injection amount Q in a combustion chamber.

At step 102, the requested holding speed VHR for removing the $NO_X$ which is contained in the exhaust gas by a desired purification rate or more is set. When the exhaust purification catalyst 13 has an $NO_X$ holding speed of the requested holding speed VHR or more, it can remove the $NO_X$ by the desired purification rate or more. In the present embodiment, the requested holding speed VHR can be set by multiplying the $NO_X$ amount NOXA which flows into the exhaust purification catalyst per unit time with a predetermined purification rate. For example, when the $NO_X$ purification rate which is requested is 80%, the $NO_X$ amount NOXA which flows in per unit time multiplied by 0.8 may be set for the requested holding speed VHR.

Next, at step 103, the holdable speed VH of the $NO_X$ of the exhaust purification catalyst is estimated. That is, the maximum amount of $NO_X$ which can be removed from the exhaust gas per unit time by the exhaust purification catalyst 13 is estimated.

Figure 21:
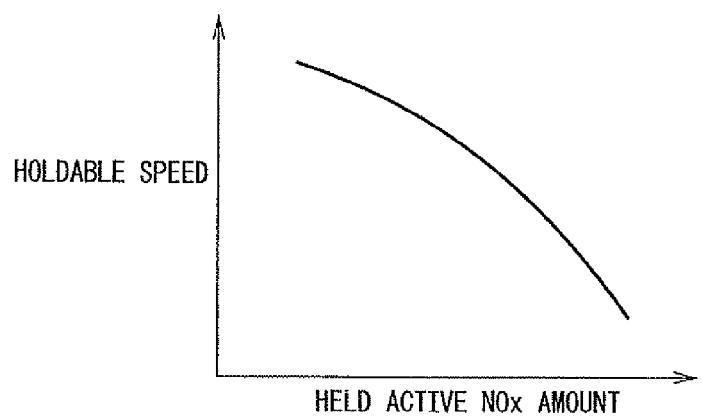
FIG. 21 is a graph which explains a relationship between a held active $NO_X$ amount and holdable speed of $NO_X$ of an exhaust purification catalyst.

FIG. 21 is a graph which shows the relationship between the held active $NO_X$ amount and the holdable speed VHB of the exhaust purification catalyst in the present embodiment. The holdable speed of the exhaust purification catalyst 13 depends on the $NO_X$ amount which is held at the exhaust purification catalyst 13, that is, the held active $NO_X$ amount. For this reason, the held active $NO_X$ amount may be used as the basis to estimate the holdable speed VHB. If the held active $NO_X$ amount ACNOXW which is held at the exhaust purification catalyst 13 becomes greater, the ability to hold the $NO_X$ which is contained in the exhaust gas becomes smaller. That is, the greater the held active $NO_X$ amount ACNOXW, the more the holdable speed VHB is decreased. Note that, the state of change of the holdable speed with respect to the held active $NO_X$ amount is determined depending on the type of the exhaust purification catalyst.

The value of the holdable speed VHB may be stored in advance as a function of the held active $NO_X$ amount ACNOXW in, for example, the electronic control unit 30. In the present embodiment, the held active $NO_X$ amount ACNOXW which is estimated every predetermined time interval is read. The control for estimating the held active $NO_X$ amount every predetermined time interval will be explained later. Here, the "held active $NO_X$ amount" may, for example, be the value estimated most recently. The held active $NO_X$ amount which is stored in the electronic control unit 30 may be used as the basis to estimate the holdable speed VHB of the exhaust purification catalyst 13.

In this regard, the holdable speed of $NO_X$ of the exhaust purification catalyst also depends on aspects of the operating state of the internal combustion engine other than the held active $NO_X$ amount. For example, the holdable speed of the exhaust purification catalyst depends on the spatial velocity at the exhaust purification catalyst. The exhaust purification system of the present embodiment detects the operating state of the internal combustion engine and uses the detected operating state of the internal combustion engine as the basis to correct the holdable speed of the $NO_X$. In the present embodiment, as the operating state of the internal combustion engine, the spatial velocity and the catalyst temperature of the exhaust purification catalyst will be explained as examples.

Figure 22:
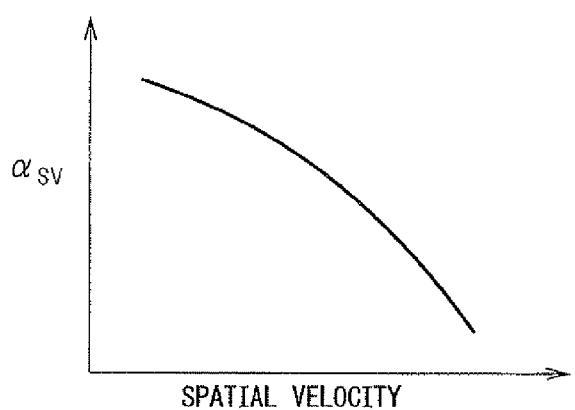
FIG. 22 is a graph which explains a relationship between a spatial velocity of an exhaust purification catalyst and a correction coefficient for calculating a holdable speed of $NO_X$.

FIG. 22 is a graph which explains a relationship between a spatial velocity in an exhaust purification catalyst and a correction coefficient of the holdable speed. When the spatial velocity SV at the exhaust purification catalyst is high, the amount of $NO_X$ which is not held at the exhaust purification catalyst, but ends up slipping through it becomes greater. For this reason, the larger the spatial velocity SV, the more the holdable speed of $NO_X$ is decreased. The spatial velocity SV, for example, can be estimated by detecting the intake air amount GA and using the detected intake air amount as the basis for the estimate. The estimated spatial velocity SV can be used as the basis to set the correction coefficient $\alpha_{SV}$. The larger the spatial velocity SV, the smaller the correction coefficient $\alpha_{SV}$ can be set.

Figure 23:
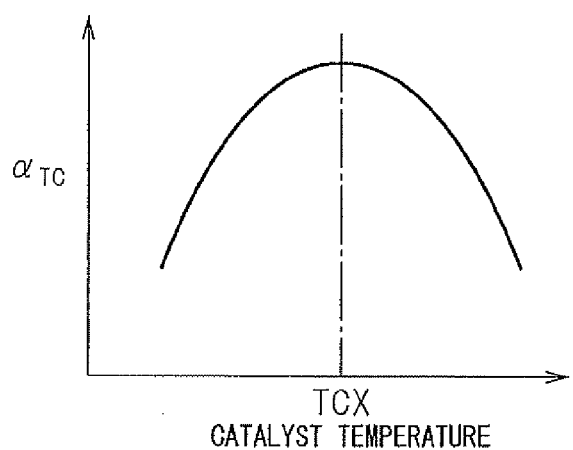
FIG. 23 is a graph which explains a relationship between a catalyst temperature of an exhaust purification catalyst and a correction coefficient for calculating a holdable speed of $NO_X$.

FIG. 23 is a graph which explains a relationship between a catalyst temperature of an exhaust purification catalyst and a correction coefficient of the holdable speed. If the catalyst temperature TC rises from a state of low temperature, the catalytic action due to the catalyst particles 13 which are held at the exhaust purification catalyst 13 becomes more active. For this reason, the oxidation of the $NO_X$ is promoted. In the temperature region up to a predetermined catalyst temperature TCX, as a general trend, the holdable speed of $NO_X$ rises along with the rise of the temperature. In this regard, in the temperature region over a predetermined catalyst temperature TCX, the effect whereby the ability to hold the active $NO_X$ which is produced falls along with the rise in temperature becomes greater. For this reason, in the region over the predetermined catalyst temperature TCX, the holdable speed of $NO_X$ falls along with the rise of the catalyst temperature TC.

The correction coefficient $\alpha_{TC}$ relating to the catalyst temperature TC increases along with the rise of the catalyst temperature TC in the region of a temperature lower than the catalyst temperature TCX. As opposed to this, the correction coefficient $\alpha_{TC}$ is decreased along with a rise in the catalyst temperature TC in the region of a high temperature of the catalyst temperature TCX or more.

The catalyst temperature TC can be detected by, for example, the temperature sensor 23 which is arranged downstream of the exhaust purification catalyst 13. It is possible to detect the catalyst temperature TC and use the detected catalyst temperature TC as the basis to set the correction coefficient $\alpha_{TC}$.

The relationship between the spatial velocity or other predetermined parameter which shows an operating state of the internal combustion engine and the correction coefficient can, for example, be stored in the electronic control unit. It is possible to detect a parameter which shows the operating state and use the detected parameter as the basis to set the correction coefficient.

The holdable speed VH of the $NO_X$ of the exhaust purification catalyst in the present embodiment may, for example, be calculated by the following formula:

$$VH = \alpha_{SV} \cdot \alpha_{TC} \cdot VHB \quad (1)$$

By using the operating state of the internal combustion engine as the basis to correct the holdable speed in this way, it is possible to estimate the holdable speed of $NO_X$ more accurately. The operating state of the internal combustion engine is not limited to the spatial velocity or the catalyst temperature. Any parameter which shows the operating state of the internal combustion engine may be employed. For example, the engine speed or the requested load may be employed as the operating state of the internal combustion engine. Further, in the present embodiment, the correction coefficient for calculating the holdable speed is set and the correction coefficient is multiplied with to calculate the holdable speed, but the invention is not limited to this. It is also possible to use any formula which can be corrected so as to correct the holdable speed. Furthermore, the estimation of the holdable speed of $NO_X$ of the exhaust purification catalyst is not limited to the above mode. Any control may be used to estimate the holdable speed of $NO_X$.

Next, the control for estimating the held active $NO_X$ amount of the exhaust purification catalyst in the first $NO_X$ purification method will be illustrated.

Figure 24:
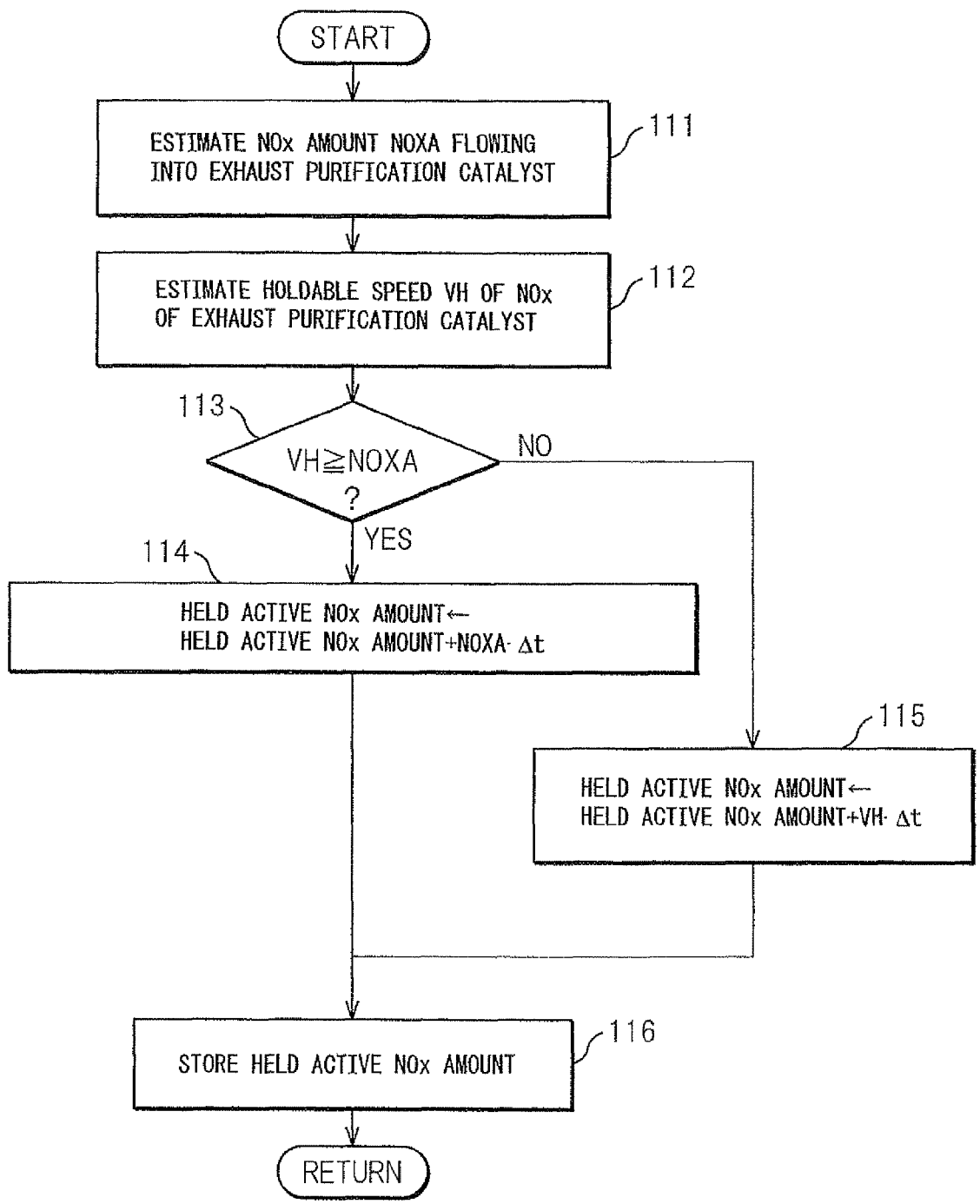
FIG. 24 is a flowchart which estimates a held active $NO_X$ amount of an exhaust purification catalyst.

FIG. 24 is a flowchart of control for estimating the held active $NO_X$ amount which is held at the exhaust purification catalyst. The control which is shown in FIG. 24 may be performed repeatedly, for example, every predetermined time interval. Further, the control for estimating the held active $NO_X$ amount can be performed independently from the control for feeding hydrocarbons which is shown in FIG. 20. In the present embodiment, the holdable speed of $NO_X$ of the exhaust purification catalyst is used to estimate the held active $NO_X$ amount.

At step 111, the $NO_X$ amount NOXA which flows into the exhaust purification catalyst per unit time is estimated. The $NO_X$ amount which flows into the exhaust purification catalyst per unit time in the present embodiment becomes the same as the $NO_X$ amount which is exhausted from the engine body per unit time.

Next, at step 112, the holdable speed VH of $NO_X$ of the exhaust purification catalyst is estimated. Here, as the holdable speed VH of $NO_X$ for example, it is possible to use the holdable speed VH of $NO_X$ which is estimated most recently. Alternatively, at step 112, it is possible to newly estimate the holdable speed VH.

Next, at step 113, it is judged if the holdable speed of $NO_X$ of the exhaust purification catalyst is the $NO_X$ amount NOXA which flows into the exhaust purification catalyst per unit time or more. When, at step 113, the holdable speed VH is the $NO_X$ amount NOXA which flows in per unit time or more, the routine proceeds to step 114. In this case, it is possible to judge that the holdable speed of $NO_X$ of the exhaust purification catalyst is large and substantially all of the $NO_X$ amount which flows into the exhaust purification catalyst is held at the exhaust purification catalyst.

At step 114, the $NO_X$ amount NOX which flows into the exhaust purification catalyst per unit time is multiplied with the elapsed time $\Delta t$ from the previous calculation of the held active $NO_X$ amount so as to calculate the amount of increase of the active $NO_X$. When estimating the held active $NO_X$ amount every predetermined time interval, this time interval may be multiplied with the $NO_X$ amount NOXA to calculate the amount of increase of the active $NO_X$. By adding the amount of increase (NOXA·$\Delta t$) of the active $NO_X$ to the previously calculated held active $NO_X$ amount ACNOXW, it is possible to calculate the current held active $NO_X$ amount.

When, at step 113, the holdable speed VH of $NO_X$ is less than the $NO_X$ amount NOXA which flows into the exhaust purification catalyst per unit time, the routine proceeds to step 115. In this case, it is possible to judge that the $NO_X$ holding ability of the exhaust purification catalyst is smaller than the $NO_X$ amount which flows into the exhaust purification catalyst. It can be judged that at least part of the $NO_X$ slipped through the exhaust purification catalyst.

At step 115, it is possible to multiple the holdable speed VH of $NO_X$ with the elapsed time $\Delta t$ from the previous calculation of the held active $NO_X$ amount to calculate the amount of increase (VH·$\Delta t$) of the active $NO_X$. The calculated amount of increase (VH·$\Delta t$) of the active $NO_X$ may be added to the previous held active $NO_X$ amount ACNOXW so as to calculate the current held active $NO_X$ amount ACNOXW.

At step 116, the held active $NO_X$ amount ACNOXW which is calculated by the current calculation is stored in the electronic control unit.

In this way, in estimation of the held active $NO_X$ amount ACNOXW, it is possible to estimate the newly held active $NO_X$ amount and add the newly held active $NO_X$ amount to the held active $NO_X$ amount of the previous calculation so as to estimate the held active $NO_X$ amount at different timings. Further, estimation of the held active $NO_X$ amount of the exhaust purification catalyst is not limited to this mode. Any control may be used to estimate the held active $NO_X$ amount.

Referring to FIG. 20, next, at step 104, it is judged if the holdable speed VH of the $NO_X$ of the exhaust purification catalyst is the requested holding speed VHR or more. When the holdable speed VH of the $NO_X$ is the requested holding speed VHR or more, it can be judged that the $NO_X$ which flows into the exhaust purification catalyst is being removed by the desired purification rate or more. The $NO_X$ holding ability of the exhaust purification catalyst is high, so it can be judged in the current control not to feed hydrocarbons from the hydrocarbon feed valve. In this case, the current operational control is ended.

When, at step 104, the holdable speed VH of the $NO_X$ of the exhaust purification catalyst is less than the requested holding speed VHR, the routine proceeds to step 105. In this case, it can be judged that the $NO_X$ purification rate of the exhaust purification catalyst has become less than the desired $NO_X$ purification rate. It is possible to judge that the $NO_X$ holding ability of the exhaust purification catalyst has become less than the predetermined judgment value of the holding ability. For this reason, control is performed to feed hydrocarbons from the hydrocarbon feed valve and remove the active $NO_X$ which is held on the exhaust purification catalyst by reduction.

At step 105, the feed amount of hydrocarbons WM which is fed from the hydrocarbon feed valve is set. In the exhaust purification system of the present embodiment, the held active $NO_X$ amount of the exhaust purification catalyst is used as the basis to set the amplitude of the concentration of hydrocarbons which flow into the exhaust purification catalyst. In the present embodiment, the current feed amount of hydrocarbons WM which corresponds to the amplitude of the concentration of hydrocarbons is set. For example, control may be performed so that the greater the active $NO_X$ amount which is held at the exhaust purification catalyst, the greater the feed amount of hydrocarbons to the engine exhaust passage.

In the present embodiment, the feed amount of hydrocarbons is set so that substantially all of the active $NO_X$ which is held at the exhaust purification catalyst can be removed. The feed amount of hydrocarbons is not limited to this, but it is possible to set the feed amount of hydrocarbons to enable removal of at least part of the $NO_X$ which is held by the exhaust purification catalyst. However, if the feed amount of hydrocarbons is too small, as explained above, the concentration of hydrocarbons in the exhaust will become smaller and all of the fed hydrocarbons will end up being oxidized. For this reason, the feed amount of hydrocarbons which are fed into the engine exhaust passage can be set to an amount by which at least part of the fed hydrocarbons are partially oxidized.

In the exhaust purification system of the present embodiment, the held active $NO_X$ amount is used as the basis to set the feed amount of hydrocarbons. Furthermore, the operating state of the internal combustion engine is detected, and the detected operating state is used as the basis to correct the amplitude of the concentration of hydrocarbons which flow into the exhaust purification catalyst. In the present embodiment, the current feed amount of hydrocarbons is corrected. For example, the efficiency of production of the reducing intermediate changes in accordance with the operating state of the internal combustion engine. Therefore, in the present embodiment, the operating state of the internal combustion engine is used as the basis to set a correction coefficient, and a reference hydrocarbon feed amount is multiplied with the correction coefficient to correct the feed amount of hydrocarbons. In the present embodiment, as the operating state of the internal combustion engine, the oxygen concentration of the exhaust gas which flows into the exhaust purification catalyst and the spatial velocity in the exhaust purification catalyst are explained as examples.

Figure 25:
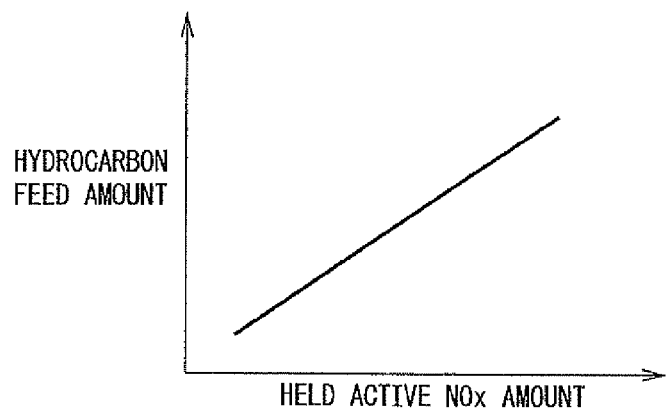
FIG. 25 is a graph which explains a relationship between a held active $NO_X$ amount and a hydrocarbon feed amount.

FIG. 25 is a graph which explains a relationship of a hydrocarbon feed amount with respect to a held active $NO_X$ amount which is held at the exhaust purification catalyst. The larger the held active $NO_X$ amount ACNOXW, the more possible it is to set the hydrocarbon feed amount WMB which is fed to the exhaust purification catalyst so as to become larger. It is possible to store values of the hydrocarbon feed amount as a function of the held active $NO_X$ amount in advance in the electronic control unit. The held active $NO_X$ amount, for example, can be a read amount which is calculated every predetermined interval. The held active $NO_X$ amount can be used as the basis to set the reference hydrocarbon feed amount WMB.

Figure 26:
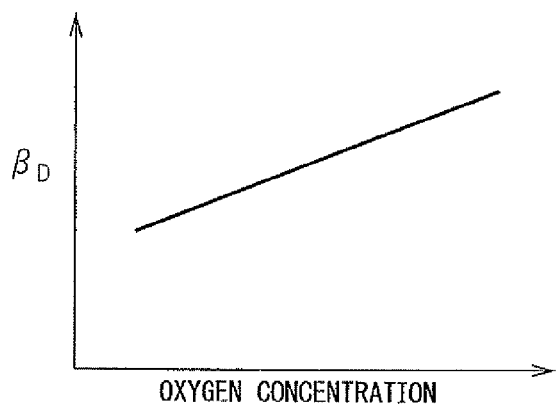
FIG. 26 is a graph which explains a relationship between an oxygen concentration of exhaust gas which flows into an exhaust purification catalyst and a correction coefficient for calculating the hydrocarbon feed amount.

FIG. 26 is a graph which explains a relationship of a correction coefficient with respect to an oxygen concentration of exhaust gas which flows into an exhaust purification catalyst when calculating the hydrocarbon feed amount. As explained before, if the oxygen concentration D of the exhaust gas which flows into the exhaust purification catalyst increases (air-fuel ratio of exhaust gas which flows into exhaust purification catalyst becomes larger), the feed amount of hydrocarbons necessary for obtaining a predetermined purification rate becomes larger.

In the present embodiment, the concentration of oxygen D which flows into the exhaust purification catalyst is detected and the oxygen concentration D is used as the basis to set a correction coefficient $\beta_D$ for when setting the hydrocarbon feed amount. In the estimation of the oxygen concentration D of the exhaust gas which flows into the exhaust purification catalyst, for example, it is possible to store a map of the oxygen concentration as a function of the engine speed and fuel injection amount in a combustion chamber in advance in the electronic control unit. It is possible to detect the engine speed and fuel injection amount so thereby estimate the oxygen concentration D of the exhaust gas which flows into the exhaust purification catalyst. Alternatively, for example, by setting an air-fuel ratio sensor in the engine exhaust passage at an upstream side from the exhaust purification catalyst as well, it is possible to estimate the concentration of oxygen which is contained in the exhaust gas.

Figure 27:
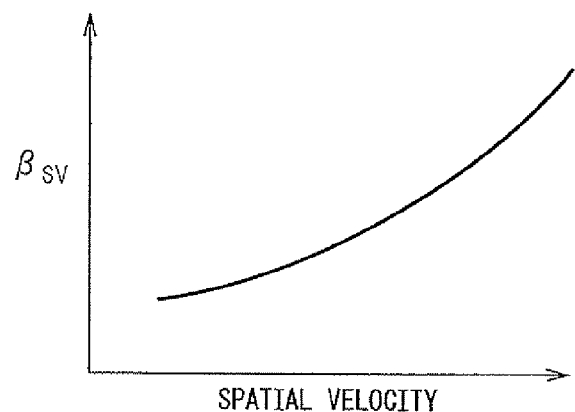
FIG. 27 is a graph which explains a relationship between a spatial velocity of exhaust gas in an exhaust purification catalyst and a correction coefficient for calculating the hydrocarbon feed amount.

FIG. 27 is a graph which explains a relationship of a correction coefficient with respect to a spatial velocity when calculating the hydrocarbon feed amount. The larger the spatial velocity SV at the exhaust purification catalyst, the greater the amount of hydrocarbons which slip through the exhaust purification catalyst 13. For this reason, to obtain a predetermined $NO_X$ purification rate, correction may be performed so that the larger the spatial velocity SV, the greater the hydrocarbon feed amount is made. The larger the spatial velocity SV, the greater the correction coefficient $\beta_{SV}$ that can be set. It is possible to estimate the spatial velocity SV and use the estimated spatial velocity SV as the basis to set the correction coefficient $\beta_{SV}$ large. The spatial velocity SV, for example, can be estimated based on the intake air amount GA.

The relationships between the operating states of the internal combustion engine and correction coefficients which are shown in FIG. 26 and FIG. 27 may be stored in advance in the electronic control unit. In the present embodiment, a reference hydrocarbon feed amount WM is set. Furthermore, a correction coefficient $\beta_D$ and correction coefficient $\beta_{SV}$ are set. Next, the feed amount of hydrocarbons WM which are fed from the hydrocarbon feed valve is set. In the exhaust purification system in the present embodiment, the following formula may be used to set the feed amount of hydrocarbons WM which are fed from the hydrocarbon feed valve.

$$WM = \beta_D \cdot \beta_{SV} \cdot WMB \quad (2)$$

By using the operating state of the internal combustion engine as the basis to correct the feed amount of hydrocarbons in this way, it is possible to keep the hydrocarbons which are fed from becoming insufficient or excessive. The operating states of the internal combustion engine for correction when setting the feed amount of hydrocarbons are not limited to the oxygen concentration of the exhaust and the spatial velocity. Any operating state of the internal combustion engine may be selected.

For example, sometimes the hydrocarbons which are fed from the hydrocarbon feed valve deposit on the walls of the exhaust pipe. The amount of deposition of hydrocarbons depends, for example, on the temperature of the exhaust pipe and the flow rate inside of the exhaust pipe. The lower the temperature of the exhaust pipe, the greater the amount of deposition of hydrocarbons. Further, the smaller the flow rate inside of the exhaust pipe, the greater the amount of deposition of hydrocarbons. For this reason, it is possible to estimate the temperature of the exhaust pipe and the flow rate inside of the exhaust pipe and use the estimated temperature and flow rate as the basis to set a correction coefficient related to the amount of deposition of hydrocarbons. Alternatively, it is possible to estimate the amount of deposition of hydrocarbons at the exhaust pipe and use the estimated amount of deposition as the basis to set the correction coefficient.

Alternatively, as the operating state of the internal combustion engine, the catalyst temperature of the exhaust purification catalyst may be mentioned. The higher the catalyst temperature, the larger the correction coefficient that can be set. When the catalyst temperature is low, the inflowing hydrocarbons deposit on the surfaces of the passages of the exhaust purification catalyst whereby local rich atmospheres are formed. For this reason, it is possible to efficiently remove the $NO_X$ even with a small amount of feed of hydrocarbons. On the other hand, if the catalyst temperature becomes higher, the amount of deposited hydrocarbons becomes smaller, so the feed amount of hydrocarbons may be corrected to increase it.

Referring to FIG. 20, at step 105, the feed amount of hydrocarbons WM is set, then, at step 106, the set feed amount of hydrocarbons is used to feed hydrocarbons from the hydrocarbon feed valve. By feeding hydrocarbons to the exhaust purification catalyst, it is possible to remove $NO_X$ from the exhaust purification catalyst.

Next, at step 107, the held active $NO_X$ amount ACNOXW of the exhaust purification catalyst is reset. In the present embodiment, the feed amount of hydrocarbons which are fed from the hydrocarbon feed valve is set to an amount by which substantially all of the active $NO_X$ which is held at the exhaust purification catalyst can be removed. For this reason, in the present embodiment, control is performed to make the held active $NO_X$ amount ACNOXW of the exhaust purification catalyst zero.

In this way, in the exhaust purification system of the present embodiment, the held active $NO_X$ amount is used as the basis to set the feed amount of hydrocarbons. By this control, it is possible to keep the hydrocarbon feed amount from becoming too small and therefore the active $NO_X$ which is held at the exhaust purification catalyst from no longer being able to be sufficiently reduced or to keep the feed amount of hydrocarbons from becoming too great and therefore hydrocarbons from being wastefully consumed. The feed amount of hydrocarbons which are fed to the exhaust purification catalyst is not limited to this. Hydrocarbons may be fed by a predetermined amount as well. In this case, as the amount of decrease of the held active $NO_X$ amount at step 107, for example, a predetermined amount may be employed.

Note that, the control which is shown in FIG. 20 may be performed while suitably switching the order of steps 101 and 102 and step 103. Alternatively, steps 101 and 102 and step 103 may be performed simultaneously.

Figure 28:
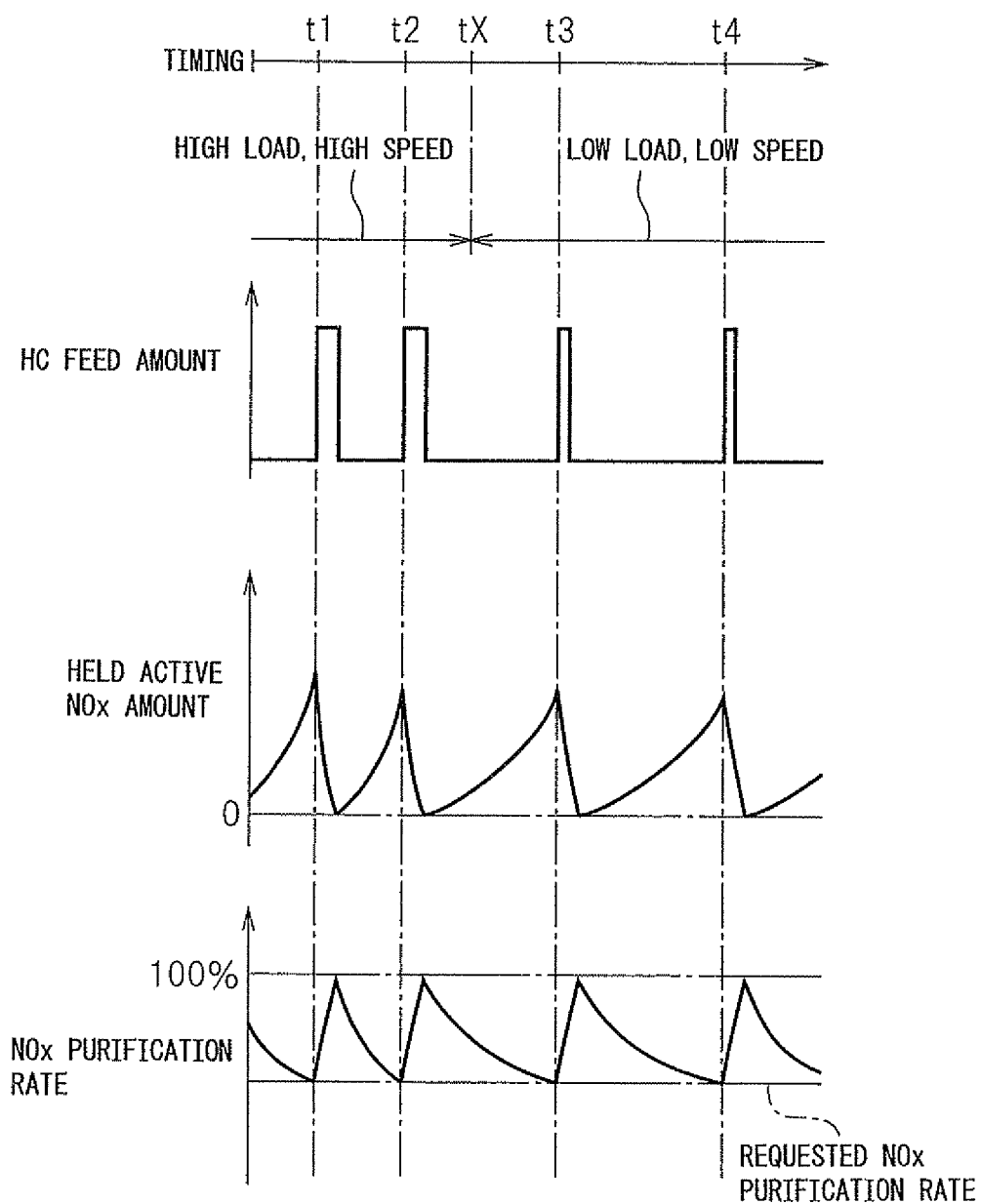
FIG. 28 is a time chart which explains an operating example in an embodiment.

FIG. 28 shows a time chart of the time when using the operational control of the present embodiment to remove $NO_X$ in the first $NO_X$ purification method. Up to the time tx, the internal combustion engine is operated by an engine load of a high load and by an engine speed of a high speed. From the time tx on, the internal combustion engine is operated by a low load and a low speed. By performing the operational control of the exhaust purification system in the present embodiment, when operating by a high load and a high speed, the feed period when feeding hydrocarbons to the engine exhaust passage becomes shorter and, furthermore, the feed amount of hydrocarbons per feed becomes greater. On the other hand, when operating by a low load and low speed, the feed period at the time of feeding the hydrocarbons becomes longer and, furthermore, the feed amount of hydrocarbons per feed becomes smaller.

In the operating example of FIG. 28, the holdable speed of $NO_X$ and requested holding speed are used as the basis to set the timing for feed of hydrocarbons. For this reason, the held active $NO_X$ amount when feeding hydrocarbons from the hydrocarbon feed valve changes in accordance with the operating state of the internal combustion engine. Further, if operating the internal combustion engine, the $NO_X$ purification rate gradually falls. In the present embodiment, when the $NO_X$ purification rate becomes the requested $NO_X$ purification rate, hydrocarbons are fed to the engine exhaust passage. By feeding hydrocarbons into the engine exhaust passage, the $NO_X$ purification rate can be restored. In the present embodiment, the $NO_X$ purification rate can be restored to substantially 100%.

In this way, the exhaust purification system of an internal combustion engine in the present embodiment can stably remove $NO_X$ by a purification rate of the desired $NO_X$ purification rate or more. Further, by performing the operational control in the present embodiment, it is possible to keep down the excessive feed of hydrocarbons.

In the above-mentioned operational control, the holdable speed of $NO_X$ of the exhaust purification catalyst is used as the basis to set the timing for feed of hydrocarbons. Furthermore, in the above-mentioned operational control, the actual. $NO_X$ holding speed of the exhaust purification catalyst is used as the basis to set the timing for feed of hydrocarbons from the hydrocarbon feed valve. For example, at step 113 of the operational control which is shown in FIG. 24, if the holdable speed VH of the $NO_X$ of the exhaust purification catalyst is the $NO_X$ amount NOXA which flows into the exhaust purification catalyst per unit time or more, the $NO_X$ amount NOXA which flows into the exhaust purification catalyst equals the actual $NO_X$ holding speed. Alternatively, at step 113, if the $NO_X$ holding speed VH is less than the $NO_X$ amount NOXA which flows into the exhaust purification catalyst per unit time, the holdable speed VH of $NO_X$ is equal to the actual $NO_X$ holding speed. In this way, in the present embodiment, the actual $NO_X$ holding speed may be used as the basis to set the timing for feed of hydrocarbons to the engine exhaust passage. The estimation of the actual $NO_X$ holding speed is not limited to this. Any control may be used to estimate the actual $NO_X$ holding speed.

In the above-mentioned operational control, as the holding ability of $NO_X$ of the exhaust purification catalyst, the $NO_X$ purification rate is employed, but the invention is not limited to this. It is possible to employ any variable related to the holding ability of the $NO_X$. For example, as the $NO_X$ holding ability of the exhaust purification catalyst, it is possible to mention the remaining amount of $NO_X$ which can be held by the exhaust purification catalyst. It is possible to discern that the smaller the remaining amount of $NO_X$ which can be held, the lower the $NO_X$ holding ability. For this reason, for example, it is possible to estimate the held $NO_X$ amount which is held on the surface of the basic layer and, when the estimated held $NO_X$ amount exceeds a predetermined judgment value of the held $NO_X$ amount, judge that the $NO_X$ holding ability of the exhaust purification catalyst is less than the judgment value of the holding ability.

Alternatively, as the $NO_X$ holding ability of the exhaust purification catalyst, it is possible to mention the holdable speed of $NO_X$ of the exhaust purification catalyst. In the above-mentioned operational control, the requested $NO_X$ purification rate is used as the basis to set the judgment value of the holdable speed, but the invention is not limited to this. It is possible to set a fixed value as the judgment value of the holdable speed in advance. For example, it is possible to estimate the holdable speed of $NO_X$ of the exhaust purification catalyst and, when the holdable speed becomes less than the predetermined judgment value of the holdable speed, judge that the holding ability of the exhaust purification catalyst has become less than the judgment value of the holding ability.

Further, in the above-mentioned operational control, instantaneous values of the holdable speed of $NO_X$ of the exhaust purification catalyst are estimated at different timings so as to set the timing for feeding hydrocarbons into the engine exhaust passage, but the invention is not limited to this. It is also possible to use the average value or cumulative value of holdable speeds in a past predetermined time period to set the timing for feeding hydrocarbons into the engine exhaust passage.

Next, an example which uses an average value of holdable speeds in a past predetermined time period so as to set the timing for feeding hydrocarbons to the engine exhaust passage will be explained. Note that, even when using a cumulative value of the holdable speeds, similar control may be performed by substituting the average value for the cumulative value.

Figure 29:
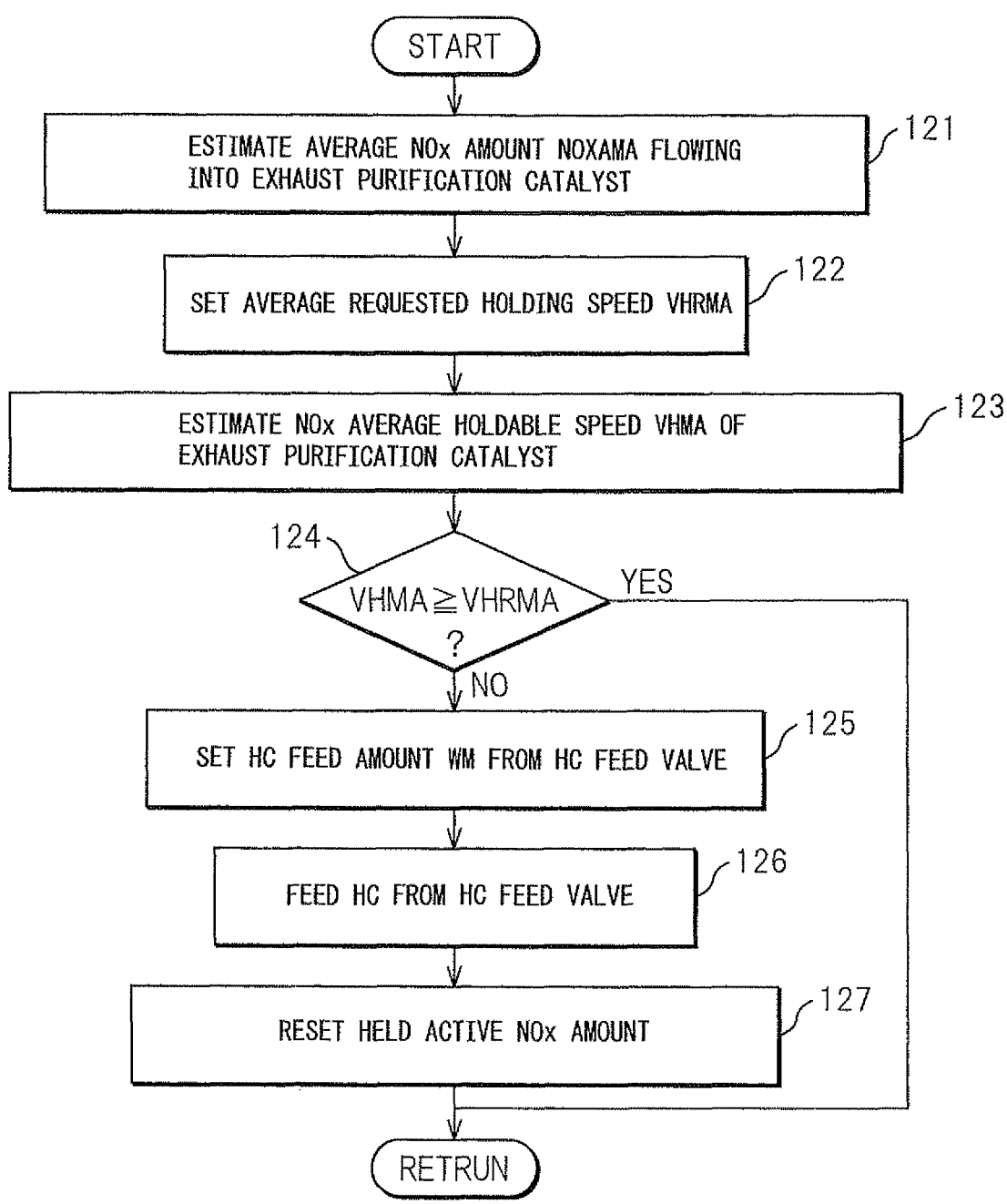
FIG. 29 is a flowchart of another operational control of the first $NO_X$ purification method in an embodiment.

FIG. 29 shows a flowchart of another operational control of an internal combustion engine in the present embodiment. In another operational control of the present embodiment, the average $NO_X$ amount which flows into the exhaust purification catalyst in a predetermined time period is estimated and an average requested holding speed for the predetermined time period is set. Further, the average holdable speed of the exhaust purification catalyst is estimated for judgment.

At step 121, the average of the $NO_X$ amounts which are exhausted per unit time from the engine body, that is, the average NOX amount NOXAMA, is estimated. In the present embodiment, the $NO_X$ amounts which are exhausted from the engine body per unit time are averaged over a time period extending back from the current point of time by a predetermined length of time. The $NO_X$ amount which is exhausted from the engine body is stored at each point of time, and the stored $NO_X$ amounts are averaged. The method of calculating the average $NO_X$ amount NOXAMA is not limited to this. Any control may be used to average the $NO_X$ amount in a past predetermined time period. For example, the $NO_X$ amounts may be averaged in a past predetermined number of calculations.

At step 122, the average requested holding speed VHRMA is set. The average requested holding speed VHRMA may be set by multiplying the average $NO_X$ amount NOXAMA which is calculated at step 121 with the desired $NO_X$ purification rate.

At step 123, the average holdable speed VHMA of $NO_X$ of the exhaust purification catalyst is estimated. In the present embodiment, the average holdable speed VHMA which is stored in the electronic control unit is read.

Figure 30:
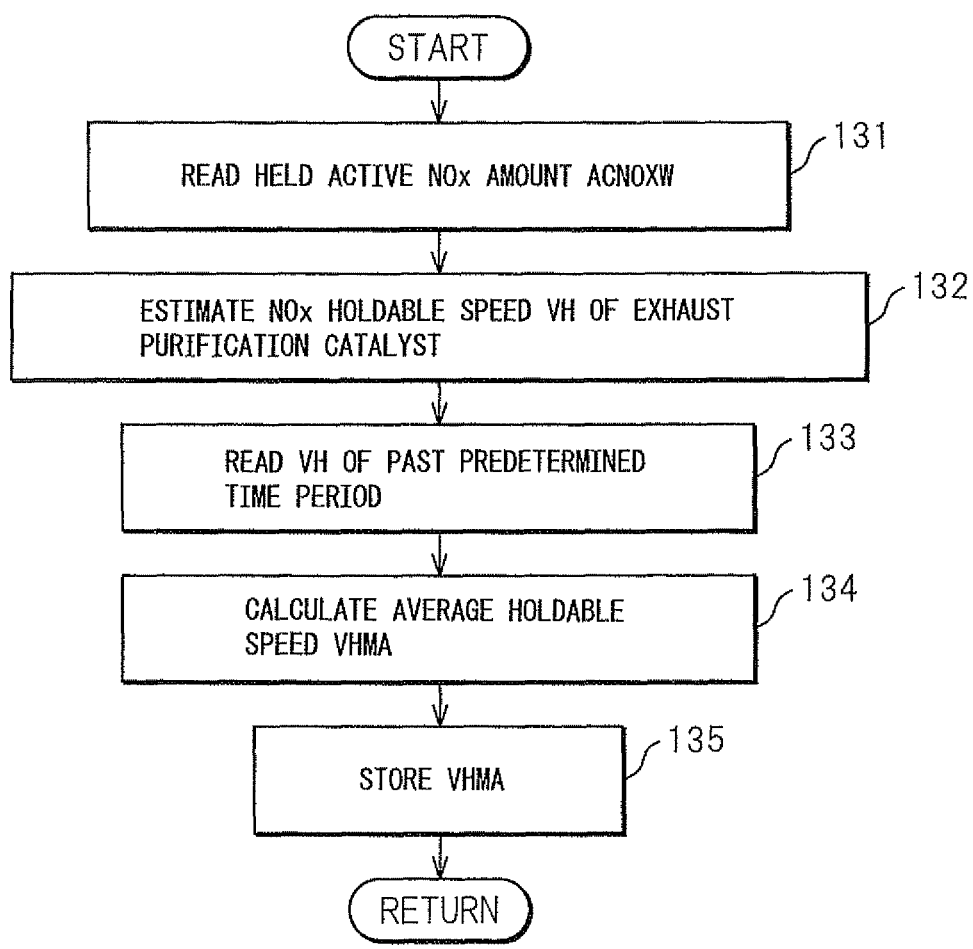
FIG. 30 is a flowchart which estimates an average holdable speed of $NO_X$ of an exhaust purification catalyst in a predetermined time period.

FIG. 30 shows a flowchart which estimates the average holdable speed in another operational control in the present embodiment. The control which is shown in FIG. 30 can be repeatedly performed for example every predetermined time interval.

At step 131, the held active $NO_X$ amount ACNOXW at the current timing is read. At step 132, the current holdable speed VH of $NO_X$ of the exhaust purification catalyst is estimated. Next, at step 133, the holdable speeds VH which were calculated in a past predetermined time period are read.

At step 134, the read holdable speeds VH of a predetermined time period and the holdable speed VH which is calculated in the current calculation are used to calculate the average holdable speed VHMA. At step 135, the calculated average holdable speed VHMA is stored in the electronic control unit.

In this way, the holdable speeds which are estimated at different timings may be used as the basis to estimate the average holdable speed VHMA at a past predetermined time period.

Referring to FIG. 29, at step 123, the average holdable speed VHMA is estimated, then the routine proceeds to step 124. At step 124, it is judged if the average holdable speed VHMA is the average requested holding speed VHRMA or more. When, at step 124, the average holdable speed VHMA is the average requested holding speed VHRMA or more, it is possible to judge that the holding ability is sufficient. When the average holdable speed VHMA is less than the average requested holding speed VHRMA, the routine proceeds to step 125.

At step 125, the feed amount of hydrocarbons from the hydrocarbon feed valve is set. At step 126, hydrocarbons are fed from the hydrocarbon feed valve. At step 127, the held active $NO_X$ amount ACNOXW of the exhaust purification catalyst is reset. Step 125 to step 127 may be performed by similar control to step 105 to step 107 of the operational control which is shown in FIG. 20 of the present embodiment.

In this way, in another operational control of the exhaust purification system in the present embodiment, the control may be performed by using the average holdable speed of $NO_X$ in a predetermined time period. By performing this control, it is possible to reduce the effects of error which occurs when estimating the holdable speed of $NO_X$ etc., the effects of measurement error when detecting the operating state of the internal combustion engine, the effects of instants of fluctuation of the operating state of the internal combustion engine, etc. As a result, it is possible to make the stability of removal of $NO_X$ rise.

In the present embodiment, a hydrocarbon feed valve is arranged in the engine exhaust passage and hydrocarbons are fed from the hydrocarbon feed valve so as to feed hydrocarbons to the exhaust purification catalyst, but the invention is not limited to this. Any device or control may be used to feed hydrocarbons to the exhaust purification catalyst.

Note that, the above embodiments may be suitably combined. Further, the above operational control may be suitably switched in order so long as the actions and functions can be maintained.

In the above figures, the same or equivalent parts are assigned the same reference signs. Note that, the above embodiments are illustrations and do not limit the invention. Further, the embodiments include changes which are shown in the claims.

REFERENCE SIGNS LIST 2 combustion chamber
8 intake air detector
13 exhaust purification catalyst
14 particulate filter
15 hydrocarbon feed valve
50 catalyst carrier
51, 52 catalyst particles
53 basic layer
54 exhaust gas flow surface part

The invention claimed is:

1. An exhaust purification system of an internal combustion engine comprising:
an engine exhaust passage;
an exhaust purification catalyst for causing a reaction between $NO_X$ that is contained in exhaust gas and modified hydrocarbons arranged inside the engine exhaust passage;
precious metal catalysts carried on an exhaust gas flow surface of the exhaust purification catalyst;
a basic exhaust gas flow surface part formed around the precious metal catalysts; and
an electronic control unit, wherein the electronic control unit is configured to control a vibration of a concentration of hydrocarbons flowing into the exhaust purification catalyst within a predetermined range of amplitude and within a predetermined range of period, and is configured to control the vibration period of the hydrocarbon concentration longer than the predetermined range of period, wherein
when the electronic control unit controls the vibration of the concentration of hydrocarbons flowing into the exhaust purification catalyst within the predetermined range of amplitude and within the predetermined range of period, a reducing intermediate containing nitrogen and hydrocarbons is produced on the precious metal catalysts and held on the basic exhaust gas flow surface part, the $NO_x$ contained in the exhaust gas catalyst is chemically reduced by the reducing intermediate held on the basic exhaust gas flow surface part in the exhaust purification catalyst, and the exhaust purification catalyst has a property of chemically reducing the $NO_X$ that is contained in the exhaust gas without storing, or storing a small amount of nitrates in the exhaust gas in the basic exhaust gas flow surface part,
when the electronic control unit controls the vibration period of the hydrocarbon concentration longer than the predetermined range, the exhaust gas catalyst has a property of being increased in a storage amount of $NO_x$ that is contained in the exhaust gas, and
the electronic control unit is further configured to estimate a holding ability for holding the $NO_X$ in the exhaust gas on the basic exhaust gas flow surface part of the exhaust purification catalyst when performing the control to cause the concentration of hydrocarbons that flow into the exhaust purification catalyst vibrate within the predetermined range of amplitude and within the predetermined range of period and, when the holding ability becomes less than a predetermined judgment value of the holding ability, the electronic control unit is configured to cause the concentration of hydrocarbons that flow into the exhaust purification catalyst to increase.

2. The exhaust purification system of an internal combustion engine as set forth in claim 1, wherein the electronic control unit is further configured to estimate a holdable speed that is a maximum speed at which the $NO_X$ in the exhaust gas can be held on the basic exhaust gas flow surface part of the exhaust purification catalyst, and is configured to use the holdable speed as the basis to estimate the holding ability.

3. The exhaust purification system of an internal combustion engine as set forth in claim 2, wherein the electronic control unit estimates a held $NO_X$ amount that is held on the basic exhaust gas flow surface part, and is configured to use an estimated held $NO_X$ amount as the basis to estimate the holdable speed.

4. The exhaust purification system of an internal combustion engine as set forth in claim 3, wherein the electronic control unit is configured to detect an operating state of the internal combustion engine, and is configured to use the operating state of the internal combustion engine as the basis to correct the holdable speed.

5. The exhaust purification system of an internal combustion engine as set forth in claim 2, wherein the holding ability includes a purification rate of $NO_X$ of the exhaust purification catalyst, and
the electronic control unit is configured to estimate a $NO_X$ amount that flows into the exhaust purification catalyst per unit time,
the electronic control unit is configured to use the $NO_X$ amount that flows into the exhaust purification catalyst per unit time and a predetermined judgment value of the purification rate of $NO_X$ as the basis to set a requested holding speed, and,
when the holdable speed becomes less than the requested holding speed, the electronic control unit is configured to determine that the holding ability has become less than the predetermined judgment value of the holding ability.

6. The exhaust purification system of an internal combustion engine as set forth in claim 1, wherein the electronic control unit is configured to estimate a held $NO_X$ amount that is held on the basic exhaust gas flow surface part and,
when an estimated held $NO_X$ amount exceeds a predetermined judgment value of the held $NO_X$ amount, the electronic control unit is configured to determine that the holding ability has become less than the judgment value of the holding ability.

7. The exhaust purification system of an internal combustion engine as set forth in claim 1, wherein the electronic control unit is configured to estimates a held $NO_X$ amount that is held on the basic exhaust gas flow surface part, and the electronic control unit is configured to use an estimated held $NO_X$ amount as the basis to set the amplitude of the concentration of hydrocarbons that flow into the exhaust purification catalyst.

8. The exhaust purification system of an internal combustion engine as set forth in claim 7, wherein the electronic control unit is configured to detect an operating state of the internal combustion engine, and the electronic control unit is configured to use the operating state of the internal combustion engine as the basis to correct the amplitude of the concentration of hydrocarbons that flow into the exhaust purification catalyst.

9. The exhaust purification system of an internal combustion engine as set forth in claim 1, wherein the predetermined vibration period of the concentration of hydrocarbons is the period required for continued production of the reducing intermediate.

10. The exhaust purification system of an internal combustion engine as set forth in claim 9, wherein the predetermined vibration period of the concentration of hydrocarbons is from 0.3 second or more to within 5 seconds.

11. The exhaust purification system of an internal combustion engine as set forth in claim 1, wherein the precious metal catalysts are comprised of at least one of rhodium (Rh) or palladium (Pd), and of platinum Pt.

12. The exhaust purification system of an internal combustion engine as set forth in claim 1, wherein the exhaust purification catalyst includes a basic layer that is formed on the exhaust gas flow surface and that contains an alkali metal, an alkali earth metal, a rare earth, or a metal that donates electrons to the $NO_x$, and a surface of the basic layer forms the basic exhaust gas flow surface part.

* * * * *